(12) United States Patent
Bauco et al.

(10) Patent No.: US 9,151,905 B2
(45) Date of Patent: Oct. 6, 2015

(54) PRETERMINATED FIBER OPTIC CONNECTOR SUB-ASSEMBLIES, AND RELATED FIBER OPTIC CONNECTORS, CABLE ASSEMBLIES, AND METHODS

(71) Applicant: CORNING OPTICAL COMMUNICATIONS LLC, Hickory, NC (US)

(72) Inventors: Anthony Sebastian Bauco, Horseheads, NY (US); Jeffrey Dean Danley, Hickory, NC (US); Robert Bruce Elkins, II, Hickory, NC (US); Steven Joseph Gregorski, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/706,577

(22) Filed: May 7, 2015

(65) Prior Publication Data
US 2015/0241638 A1 Aug. 27, 2015

Related U.S. Application Data

(62) Division of application No. 13/871,395, filed on Apr. 26, 2013, now Pat. No. 9,052,469.

(51) Int. Cl.
*G02B 6/255* (2006.01)
*G02B 6/38* (2006.01)

(52) U.S. Cl.
CPC ............ *G02B 6/3846* (2013.01); *G02B 6/2551* (2013.01); *G02B 6/3861* (2013.01)

(58) Field of Classification Search
CPC .. G02B 6/2551; G02B 6/2558; G02B 6/2835; G02B 6/2553; G02B 6/255

USPC ............ 385/76, 77, 78, 85, 87, 88, 92, 95, 96
See application file for complete search history.

(56) References Cited

U.S. PATENT DOCUMENTS

| | | |
|---|---|---|
| 346,958 A | 8/1886 | Stone |
| 2,878,039 A | 3/1959 | Hoegee et al. |

(Continued)

FOREIGN PATENT DOCUMENTS

| | | |
|---|---|---|
| CA | 2270147 A1 | 10/1999 |
| DE | 19517750 A1 | 11/1996 |

(Continued)

OTHER PUBLICATIONS

Shinji Koike et al, Spring-8 X-Ray Micro-Tomography Observations of Zirconium Inclusions in $CO\$\_\{2\}\$$ Laser Fusion Splice for Single Mode Optical Fibers, IEEE Transactions on Components, Packaging and Manufacturing Technology, vol. 1, No. 1, Jan. 2011, 12 pages.

*Primary Examiner* — Jennifer Doan

(57) ABSTRACT

Embodiments disclosed herein include pre-terminated fiber optic connector sub-assemblies, and related fiber optic connectors, cables, and methods. In certain embodiments, an optical fiber stub is pre-installed in a ferrule bore of a ferrule of a fiber optic connector sub-assembly, to provide the pre-terminated fiber optic connector sub-assembly. The optical fiber stub can be pre-installed in the ferrule bore prior to termination of the fiber optic connector sub-assembly. Because the pre-terminated optical fiber stub disposed in the ferrule bore is not directly accessible through a ferrule body of the ferrule when a field optical fiber is disposed in the ferrule bore for fusion splicing, the ferrule has properties that allow thermal energy to be directed through the ferrule body into the ferrule bore. In this manner, the optical fiber stub pre-installed in the ferrule bore can be fusion spliced with the field optical fiber to terminate a fiber optic cable.

20 Claims, 16 Drawing Sheets

(56) References Cited

U.S. PATENT DOCUMENTS

| | | |
|---|---|---|
| 3,671,926 A | 6/1972 | Nepovim |
| 3,686,623 A | 8/1972 | Nijman |
| 3,744,011 A | 7/1973 | Blanchenot |
| 3,761,870 A | 9/1973 | Drezin et al. |
| 3,854,789 A | 12/1974 | Kaplan |
| 4,093,335 A | 6/1978 | Schwartz et al. |
| 4,147,402 A | 4/1979 | Chown |
| 4,345,930 A | 8/1982 | Basola et al. |
| 4,510,005 A | 4/1985 | Nijman |
| 4,598,974 A | 7/1986 | Munn et al. |
| 4,676,577 A | 6/1987 | Szegda |
| 4,678,268 A | 7/1987 | Russo et al. |
| 4,711,518 A | 12/1987 | Shank et al. |
| 4,798,431 A | 1/1989 | Clark et al. |
| 4,838,641 A | 6/1989 | Morimoto et al. |
| 4,859,827 A | 8/1989 | Coyle, Jr. et al. |
| 4,877,303 A | 10/1989 | Caldwell et al. |
| 4,923,412 A | 5/1990 | Morris |
| 4,932,989 A | 6/1990 | Presby |
| 4,952,174 A | 8/1990 | Sucht et al. |
| 5,011,254 A | 4/1991 | Edwards et al. |
| 5,018,822 A | 5/1991 | Freismuth et al. |
| 5,028,114 A | 7/1991 | Krausse et al. |
| 5,042,891 A | 8/1991 | Mulholland et al. |
| 5,059,139 A | 10/1991 | Spinner |
| 5,101,090 A | 3/1992 | Coyle, Jr. et al. |
| 5,129,023 A | 7/1992 | Anderson et al. |
| 5,146,527 A | 9/1992 | Mallinson |
| 5,222,171 A | 6/1993 | Straus |
| 5,226,101 A | 7/1993 | Szentesi et al. |
| 5,256,851 A | 10/1993 | Presby |
| 5,291,570 A | 3/1994 | Filgas et al. |
| 5,317,661 A | 5/1994 | Szentesi et al. |
| 5,337,633 A | 8/1994 | Carpenter et al. |
| 5,367,594 A | 11/1994 | Essert et al. |
| 5,421,928 A | 6/1995 | Knecht et al. |
| 5,436,994 A | 7/1995 | Ott et al. |
| 5,461,690 A | 10/1995 | Lampert |
| 5,465,313 A | 11/1995 | Belenkly et al. |
| 5,481,634 A | 1/1996 | Anderson et al. |
| 5,481,640 A | 1/1996 | Harman et al. |
| 5,548,677 A | 8/1996 | Kakii et al. |
| 5,582,671 A | 12/1996 | Harman et al. |
| 5,604,832 A | 2/1997 | Hall et al. |
| 5,606,635 A | 2/1997 | Haake |
| 5,638,474 A | 6/1997 | Lampert et al. |
| 5,717,813 A | 2/1998 | Harman et al. |
| 5,719,977 A | 2/1998 | Lampert et al. |
| 5,720,907 A | 2/1998 | Anderson et al. |
| 5,748,819 A | 5/1998 | Szentesi et al. |
| 5,751,874 A | 5/1998 | Chudoba et al. |
| 5,764,833 A | 6/1998 | Kakii et al. |
| 5,772,720 A | 6/1998 | Taira-Griffin et al. |
| 5,943,460 A | 8/1999 | Mead et al. |
| 5,954,974 A | 9/1999 | Broer et al. |
| 5,966,485 A | 10/1999 | Luther et al. |
| 6,068,410 A | 5/2000 | Giebel et al. |
| 6,078,719 A | 6/2000 | Wiegand et al. |
| 6,079,297 A | 6/2000 | Chandler et al. |
| 6,095,828 A | 8/2000 | Burland |
| 6,139,196 A | 10/2000 | Feth et al. |
| 6,158,298 A | 12/2000 | Hara |
| 6,183,298 B1 | 2/2001 | Henningsen |
| 6,246,026 B1 | 6/2001 | Vergeest |
| 6,282,349 B1 | 8/2001 | Griffin |
| 6,331,123 B1 | 12/2001 | Rodrigues |
| 6,361,219 B1 | 3/2002 | Blyler, Jr. et al. |
| 6,375,509 B2 | 4/2002 | Mountford |
| 6,413,450 B1 | 7/2002 | Mays, Jr. |
| 6,509,547 B1 | 1/2003 | Bernstein et al. |
| 6,534,741 B2 | 3/2003 | Presby |
| 6,585,423 B1 | 7/2003 | Vergeest |
| 6,716,041 B2 | 4/2004 | Ferderer et al. |
| 6,738,544 B2 | 5/2004 | Culbert et al. |
| 6,742,936 B1 | 6/2004 | Knecht et al. |
| 6,754,960 B1 | 6/2004 | Shiraishi et al. |
| 6,774,341 B2 | 8/2004 | Ohta |
| 6,802,738 B1 | 10/2004 | Henningsen |
| 6,805,491 B2 | 10/2004 | Durrant et al. |
| 6,808,415 B1 | 10/2004 | Montena |
| 6,817,785 B2 | 11/2004 | Tian |
| 6,822,190 B2 | 11/2004 | Smithson et al. |
| 6,825,440 B2 | 11/2004 | Ohta et al. |
| 6,860,651 B2 | 3/2005 | DeRosa et al. |
| 6,863,444 B2 | 3/2005 | Anderson et al. |
| 6,884,115 B2 | 4/2005 | Malloy |
| 6,886,991 B2 | 5/2005 | Endo |
| 6,888,987 B2 | 5/2005 | Sercel et al. |
| 6,902,327 B1 | 6/2005 | Johnson |
| 6,939,055 B2 | 9/2005 | Durrant et al. |
| 6,951,994 B2 | 10/2005 | Mays, Jr. |
| 6,955,478 B2 | 10/2005 | Durrant et al. |
| 6,957,920 B2 | 10/2005 | Luther et al. |
| 6,960,627 B2 | 11/2005 | Huth et al. |
| 6,963,687 B2 | 11/2005 | Vergeest et al. |
| 6,968,103 B1 | 11/2005 | Schroll et al. |
| 7,011,454 B2 | 3/2006 | Caveney et al. |
| 7,023,001 B2 | 4/2006 | Cournoyer et al. |
| 7,029,187 B2 | 4/2006 | Chapman et al. |
| 7,082,250 B2 | 7/2006 | Jones et al. |
| 7,104,702 B2 | 9/2006 | Barnes et al. |
| 7,142,741 B2 | 11/2006 | Osborne |
| 7,147,384 B2 | 12/2006 | Hardcastle et al. |
| 7,178,990 B2 | 2/2007 | Caveney et al. |
| 7,216,512 B2 | 5/2007 | Danley et al. |
| 7,241,056 B1 | 7/2007 | Kuffel et al. |
| 7,261,594 B2 | 8/2007 | Kodama et al. |
| 7,264,403 B1 | 9/2007 | Danley et al. |
| 7,264,410 B1 | 9/2007 | Doss et al. |
| 7,267,491 B2 | 9/2007 | Luther et al. |
| 7,280,733 B2 | 10/2007 | Larson et al. |
| 7,306,376 B2 | 12/2007 | Scerbak et al. |
| 7,324,723 B2 | 1/2008 | Shioda et al. |
| 7,324,724 B2 | 1/2008 | Levesque et al. |
| 7,347,627 B2 | 3/2008 | Saito et al. |
| 7,369,738 B2 | 5/2008 | Larson et al. |
| 7,377,700 B2 | 5/2008 | Manning et al. |
| 7,398,599 B2 | 7/2008 | Shiraishi et al. |
| 7,419,308 B2 | 9/2008 | Ma |
| 7,452,138 B2 | 11/2008 | Saito et al. |
| 7,507,031 B2 | 3/2009 | Kawasaki |
| 7,509,004 B2 | 3/2009 | Coleman |
| 7,540,668 B2 | 6/2009 | Brown |
| 7,556,438 B2 | 7/2009 | Oike et al. |
| 7,568,845 B2 | 8/2009 | Caveney et al. |
| 7,594,764 B2 | 9/2009 | Palmer et al. |
| 7,628,549 B2 | 12/2009 | Takahashi et al. |
| 7,630,609 B1 | 12/2009 | Mays, Jr. et al. |
| 7,632,143 B1 | 12/2009 | Islam |
| 7,637,673 B2 | 12/2009 | Oike et al. |
| 7,651,376 B2 | 1/2010 | Schreier |
| 7,654,748 B2 | 2/2010 | Kuffel et al. |
| 7,695,201 B2 | 4/2010 | Douglas et al. |
| 7,722,262 B2 | 5/2010 | Caveney et al. |
| 7,802,927 B2 | 9/2010 | Benjamin et al. |
| 7,822,309 B2 * | 10/2010 | Bianchi .................. 385/134 |
| 7,892,005 B2 | 2/2011 | Haube |
| 7,918,687 B2 | 4/2011 | Paynter et al. |
| 7,934,874 B2 | 5/2011 | Honma et al. |
| 7,972,176 B2 | 7/2011 | Burris et al. |
| 8,041,177 B2 | 10/2011 | Zimmel et al. |
| 8,052,836 B2 | 11/2011 | Cale et al. |
| 8,070,504 B2 | 12/2011 | Amidon et al. |
| 8,101,885 B2 | 1/2012 | Nakamae et al. |
| 8,104,974 B1 | 1/2012 | Gurreri |
| 8,109,679 B2 | 2/2012 | Danley et al. |
| 8,132,971 B2 | 3/2012 | Luther et al. |
| 8,157,587 B2 | 4/2012 | Paynter et al. |
| 8,224,144 B2 | 7/2012 | Allen |
| 8,369,677 B2 | 2/2013 | Allen |
| 8,408,813 B2 | 4/2013 | Barnes et al. |
| 8,459,880 B2 | 6/2013 | Castonguay et al. |
| 8,494,331 B2 * | 7/2013 | Takeuchi et al. ......... 385/135 |
| 8,523,455 B2 | 9/2013 | Luther et al. |

(56) References Cited

U.S. PATENT DOCUMENTS

| | | |
|---|---|---|
| 8,702,318 B2 | 4/2014 | Isenhour et al. |
| 2003/0194890 A1 | 10/2003 | Ferderer et al. |
| 2004/0234211 A1 | 11/2004 | Durrant et al. |
| 2005/0008307 A1 | 1/2005 | Culbert et al. |
| 2005/0094945 A1 | 5/2005 | Danley et al. |
| 2005/0191014 A1 | 9/2005 | Renfro, Jr. et al. |
| 2005/0284852 A1 | 12/2005 | Vergeest et al. |
| 2006/0137403 A1 | 6/2006 | Barr et al. |
| 2006/0266743 A1 | 11/2006 | Chi et al. |
| 2008/0032556 A1 | 2/2008 | Schreier |
| 2008/0067158 A1 | 3/2008 | Levesque |
| 2008/0210362 A1 | 9/2008 | Douglass et al. |
| 2010/0022125 A1 | 1/2010 | Burris et al. |
| 2010/0101277 A1 | 4/2010 | Gonthier et al. |
| 2010/0215319 A1 | 8/2010 | Childers et al. |
| 2010/0303416 A1 | 12/2010 | Danley et al. |
| 2010/0323541 A1 | 12/2010 | Amidon et al. |
| 2011/0142402 A1 | 6/2011 | Tachikura et al. |
| 2012/0014649 A1 | 1/2012 | Duis et al. |
| 2012/0027356 A1 | 2/2012 | Gurreri |
| 2012/0027358 A1 | 2/2012 | Webb et al. |
| 2012/0219258 A1 | 8/2012 | Grandidge et al. |
| 2012/0237172 A1 | 9/2012 | Chen et al. |
| 2012/0243839 A1 | 9/2012 | Tamekuni et al. |
| 2012/0288238 A1 | 11/2012 | Park et al. |
| 2013/0121653 A1 | 5/2013 | Shitama et al. |

FOREIGN PATENT DOCUMENTS

| | | |
|---|---|---|
| EP | 0547778 A1 | 6/1993 |
| EP | 0468671 B1 | 1/1996 |
| EP | 0864888 A1 | 9/1998 |
| EP | 2081064 A1 | 7/2009 |
| JP | 2005265973 A | 9/2005 |
| JP | 2005265974 A | 9/2005 |
| JP | 2009229506 A | 10/2009 |
| WO | 0161394 A1 | 8/2001 |
| WO | 0161395 A1 | 8/2001 |
| WO | 0161870 A2 | 8/2001 |
| WO | 2004003612 A1 | 1/2004 |
| WO | 2008103239 A1 | 8/2008 |

* cited by examiner

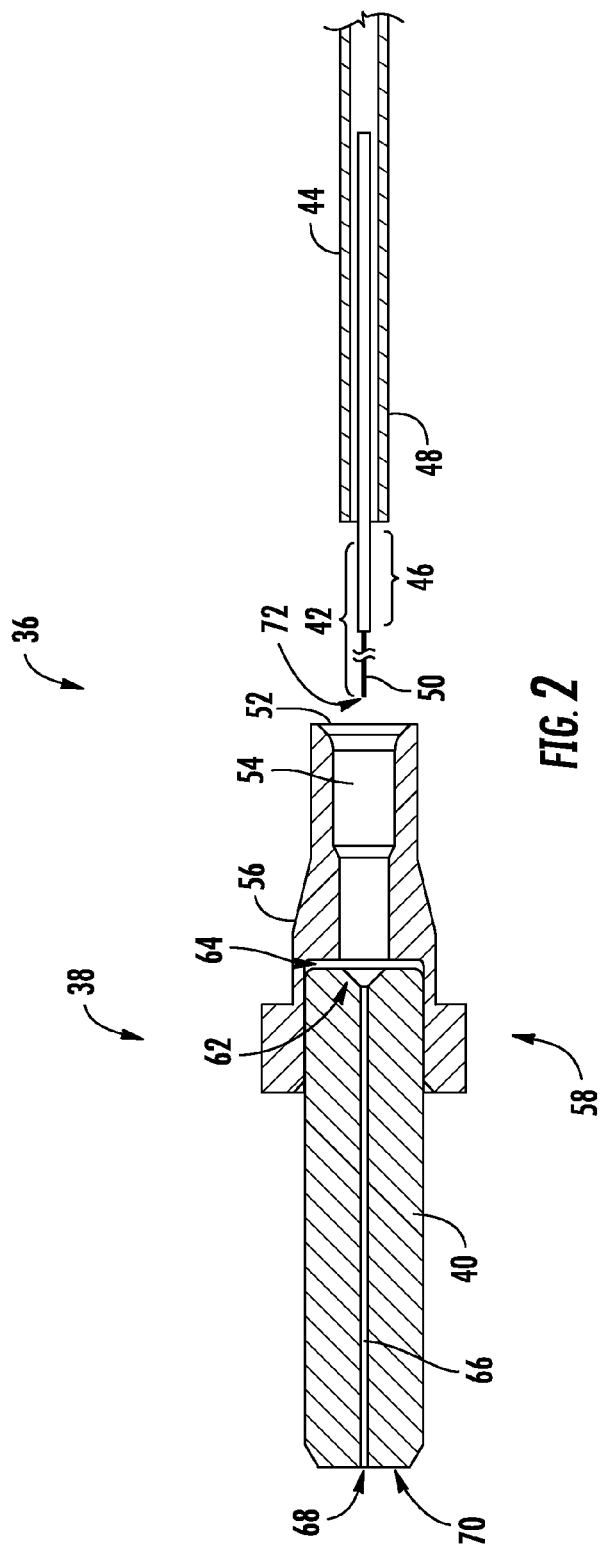

PRETERMINATED FIBER OPTIC CONNECTOR SUB-ASSEMBLIES, AND RELATED FIBER OPTIC CONNECTORS, CABLE ASSEMBLIES, AND METHODS

PRIORITY APPLICATION

This application is a divisional of U.S. patent application Ser. No. 13/871,395, filed on Apr. 26, 2013, the content of which is relied upon and incorporated herein by reference in its entirety, and the benefit of priority under 35 U.S.C. §120 is hereby claimed.

BACKGROUND

1. Field

The technology of the disclosure relates to termination of fiber optic connectors on optical fibers or fiber optic cables.

2. Technical Background

Benefits of utilizing optical fiber include extremely wide bandwidth and low noise operation. Because of these advantages, optical fiber is increasingly being used for a variety of applications, including but not limited to broadband voice, video, and data transmission in communications networks. As a result, communications networks include a number of optical interconnection points in fiber optic equipment and between fiber optic cables in which optical fibers must be interconnected via fiber optic connections. To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during the manufacturing of the fiber optic cables.

In this regard, a fiber optic connector typically employs a fiber optic connector sub-assembly in the form of a pre-assembled ferrule holder module. The connector sub-assembly contains a ferrule holder that holds a ferrule. A ferrule is a component that receives, supports, and positions one or more optical fibers in a known location with respect to a housing of a fiber optic connector. The ferrule holder has a passage extending therethrough that is axially aligned with a ferrule bore in the ferrule. Thus, when the housing of an assembled fiber optic connector is mated with another fiber optic connector or adapter, the optical fiber(s) disposed in the ferrule is positioned in a known, fixed location about the housing of the fiber optic connector. Thus, the optical fiber(s) are aligned with other optical fiber(s) provided in the mated fiber optic connector or adapter to establish an optical connection.

A fiber optic connector may be terminated on an optical fiber(s) in a factory or in the field. To terminate a fiber optic connector on an optical fiber(s), an epoxy may first be disposed in the ferrule holder passage. The optical fiber(s) extending from a stripped fiber optic cable is then inserted into the ferrule holder passage of the fiber optic connector sub-assembly and into the ferrule bore of the ferrule. If the ferrule is a "pass-through" ferrule, an end portion(s) of the optical fiber(s) is extended through the ferrule bore on an end face of the ferrule. The fiber optic connector sub-assembly may then be subjected to a curing processing to cure the epoxy to secure the optical fiber(s) in the ferrule holder passage. Thereafter, the face of the optical fiber(s) extending through the ferrule bore at the end face of the ferrule may be prepared and polished to prepare an optical end face on the ferrule of the fiber optic connector sub-assembly. Also, field terminations of fiber optic connectors may employ assembly of fiber optic connector sub-assemblies in the factory as described above, where an optical fiber stub(s) are left extending out of the rear end of the fiber optic connector sub-assembly. The optical fiber stub(s) can then be fusion spliced to optical fibers stripped from a fiber optic cable in the field by technicians.

These methods of terminating a fiber optic connector on an optical fiber(s) in fiber optic cable preparations include manual labor. The influence of manual labor in the termination process provides cost, affects quality, and can decrease throughput in processing fiber optic connector terminations. Automated fiber optic connector termination processes for fiber optic cable preparations have been employed to reduce manual labor influence, but at significant capital costs. Even so, these automated fiber optic connector terminations processes may not be flexible with respect to terminating varieties of fiber optic connectors or fiber optic cable types. Further, with these fiber optic connector termination processes, if one fiber optic connector termination fails, it must be reworked or the entire fiber optic cable must scrapped. In either case, the fiber optic cable assembly can be delayed, thereby disrupting fiber optic cable assembly throughput and increasing scrapped fiber optic cables, increasing costs as a result.

SUMMARY

Embodiments disclosed herein include pre-terminated fiber optic connector sub-assemblies. Related fiber optic connectors, cable assemblies, and methods are also disclosed. In certain embodiments, an optical fiber stub is pre-installed in a ferrule bore (also known as a "micro-hole") of the ferrule of a fiber optic connector sub-assembly, to provide the pre-terminated fiber optic connector sub-assembly. The optical fiber stub, which is shorter in length than the ferrule length, can be pre-installed in the ferrule bore of the ferrule, prior to termination of the fiber optic connector sub-assembly on a fiber optic cable. If the ferrule is a multi-fiber ferrule, multiple optical fiber stubs may be pre-installed in the ferrule. Because the pre-terminated optical fiber stub is not directly accessible through a ferrule body of the ferrule when a field optical fiber is disposed in the ferrule body to be fusion spliced with the optical fiber stub, the ferrule has properties that allow thermal energy to be directed through the ferrule body into the ferrule bore of the ferrule. In this manner, the pre-installed optical fiber stub(s) in the ferrule bore of the ferrule can be fusion spliced with another optical fiber(s) of a fiber optic cable to terminate the fiber optic cable. To terminate a fiber optic cable with the pre-terminated fiber optic connector sub-assembly, an end portion of an optical fiber from the fiber optic cable can be inserted into the rear end of the ferrule bore of the fiber optic connector sub-assembly and fusion spliced with a rear end of the pre-installed optical fiber stub disposed within the ferrule bore of the ferrule.

Providing a pre-terminated fiber optic sub-assembly that includes an optical fiber stub that can be fusion spliced within a ferrule bore of a ferrule, wherein the optical fiber stub is not directly accessible through the ferrule body outside of the ferrule bore openings, may be advantageous. As a non-limiting example, fusion splicing may provide an enhanced optical termination over mechanical splicing. Further, as another example, by providing a ferrule that has properties to allow thermal energy to be directed through the ferrule body into the ferrule bore of the ferrule, a fiber access opening or port beyond the ferrule bore is not required to be provided in the ferrule body. Providing a fiber access opening or port in the ferrule would expose the optical fiber stub outside of the ferrule bore during splicing.

Further, providing a pre-terminated fiber optic sub-assembly that includes an optical fiber stub that can be fusion spliced within a ferrule bore of a ferrule can also allow highly automated fiber optic cable termination processes. As a non-limiting example, the pre-terminated fiber optic connector sub-assemblies disclosed herein can be assembled and prepared as a small and more easily automatable part, separately and independently from a fiber optic cable assembly. The pre-installed optical fiber stub extending from a front end of the ferrule of a pre-terminated fiber optic connector sub-assembly can be prepared and polished to provide an optical end face on the ferrule, before being terminated on a fiber optic cable. The entire fiber optic cable assembly does not have to accompany the pre-terminated fiber optic connector sub-assembly during its preparation and assembly. The assembled and prepared pre-terminated fiber optic connector sub-assemblies can then be distributed within a factory or in the field, to be used to terminate and connectorize a fiber optic cable.

Also as another non-limiting example, the pre-terminated fiber optic connector sub-assemblies disclosed herein, being capable of assembly and preparation independent of fiber optic cable assembly processes, allows the pre-terminated fiber optic connector sub-assemblies to be prepared to desired specifications independent of the fiber optic cable assembly processes or cable type. This may allow processes for assembly and preparation of pre-terminated fiber optic connector sub-assemblies to not be specific to or limited by specific fiber optic cable assembly processes and/or cable types. The pre-terminated fiber optic connector sub-assemblies disclosed herein can also be tested prior to termination on a fiber optic cable. Thus, pre-terminated fiber optic connector sub-assemblies discovered as having flaws requiring rework or scrapping, will not add delay in independent fiber optic cable sub-assembly processes. Also, testing prepared optical end faces of ferrules in pre-terminated fiber optic connector sub-assemblies prior to termination on a fiber optic cable can reduce the risk of discovering a flaw only after termination and risking scrapping an entire fiber optic cable assembly. Providing pre-terminated fiber optic connector sub-assemblies that can be fusion spliced within the ferrule bore may also allow improved termination efficiency of fiber optic cables by technicians in the field, because the pre-installed optical fiber stub and end face preparations can be performed prior to termination in a factory, according to highly automated and precise factory processes.

In this regard in one embodiment, a pre-terminated fiber optic connector sub-assembly is provided. The pre-terminated fiber optic connector sub-assembly comprises a ferrule. The ferrule comprises a front end and a rear end. The ferrule further comprises a ferrule body and at least one ferrule bore extending between at least one front opening disposed in the front end of the ferrule body and at least one rear opening disposed in the rear end of the ferrule body. The pre-terminated fiber optic connector sub-assembly also comprises at least one optical fiber stub. The at least one optical fiber stub is disposed through the at least one ferrule bore, wherein the at least one optical fiber stub is not directly accessible through the ferrule body. The at least one optical fiber stub comprises at least one rear end disposed within the at least one ferrule bore. The at least one rear end of the at least one optical fiber stub is configured to be fusion spliced within the at least one ferrule bore to at least one end portion of at least one optical fiber disposed within at least one ferrule bore, to terminate the at least one optical fiber.

In another embodiment, a method of pre-terminating a fiber optic connector sub-assembly is provided. The method comprises providing at least one optical fiber stub of a fixed length. The at least one optical fiber stub has at least one front end and at least one rear end. The method further comprises inserting the at least one optical fiber stub through at least one ferrule bore of a ferrule body of a ferrule, wherein the at least one optical fiber stub disposed in the at least one ferrule bore is not directly accessible through the ferrule body. The method further comprises extending at least one front end of the at least one optical fiber stub through at least one front opening of the ferrule body from a front end of the ferrule body to dispose at least one rear end of the at least one optical fiber stub within the at least one ferrule bore at the front end of the ferrule body. The method further comprises inserting at least one front end of at least one optical fiber through at least one rear opening of the ferrule into the at least one ferrule bore of the ferrule, adjacent to the at least one rear end of the at least one optical fiber stub. The method further comprises fusion splicing the at least one rear end of the at least one optical fiber stub with the at least one front end of the at least one optical fiber within the at least one ferrule bore to terminate the at least one optical fiber.

In another embodiment, a terminated fiber optic cable assembly is provided. The terminated fiber optic cable assembly comprises a pre-terminated fiber optic connector sub-assembly. The pre-terminated fiber optic connector sub-assembly comprises a ferrule. The ferrule comprises a front end and a rear end. The ferrule further comprises a ferrule body and at least one ferrule bore extending between at least one front opening disposed in the front end of the ferrule body and at least one rear opening disposed in the rear end of the ferrule body. The pre-terminated fiber optic connector sub-assembly also comprises at least one optical fiber stub. The at least one optical fiber stub is disposed through the at least one ferrule bore. The at least one optical fiber stub comprises at least one rear end disposed within the at least one ferrule bore, wherein the at least one optical fiber stub disposed in the at least one ferrule bore is not directly accessible through the ferrule body.

The terminated fiber optic cable assembly also comprises a fiber optic cable. The fiber optic cable comprises at least one optical fiber. At least one front end of the at least one optical fiber is inserted through the at least one front opening of the ferrule into the at least one ferrule bore of the ferrule adjacent to the at least one rear end of the at least one optical fiber stub. The at least one rear end of the at least one optical fiber stub is fusion spliced with the at least one front end of the at least one optical fiber within the at least one ferrule bore. As an example, the at least one optical fusion splicing the at least one rear end of the at least one optical fiber stub with the at least one front end of the at least one optical fiber within the at least one ferrule bore terminates the pre-terminated fiber optic connector sub-assembly on the fiber optic cable, to connectorize the fiber optic cable.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2 is a cross-section view of an exemplary fiber optic connector sub-assembly that receives an end portion of a fiber optic cable extending through the ferrule bore and through a front opening of the ferrule to terminate the fiber optic connector sub-assembly on the end portion of the fiber optic cable;

FIG. 4C-1 is a right side, perspective, cross-sectional view of the fiber optic connector sub-assembly in FIG. 4B, illustrating an optical fiber stub ready to be disposed through a front opening of the ferrule bore to be disposed at a front end of the ferrule;

FIG. 4C-2 is a right side, perspective, cross-sectional view of the fiber optic connector sub-assembly in FIG. 4B, illustrating an alternative embodiment of the optical fiber stub ready to be disposed through a rear opening of the ferrule bore of the ferrule to be disposed at a front end of the ferrule;

DETAILED DESCRIPTION

Figure 1:
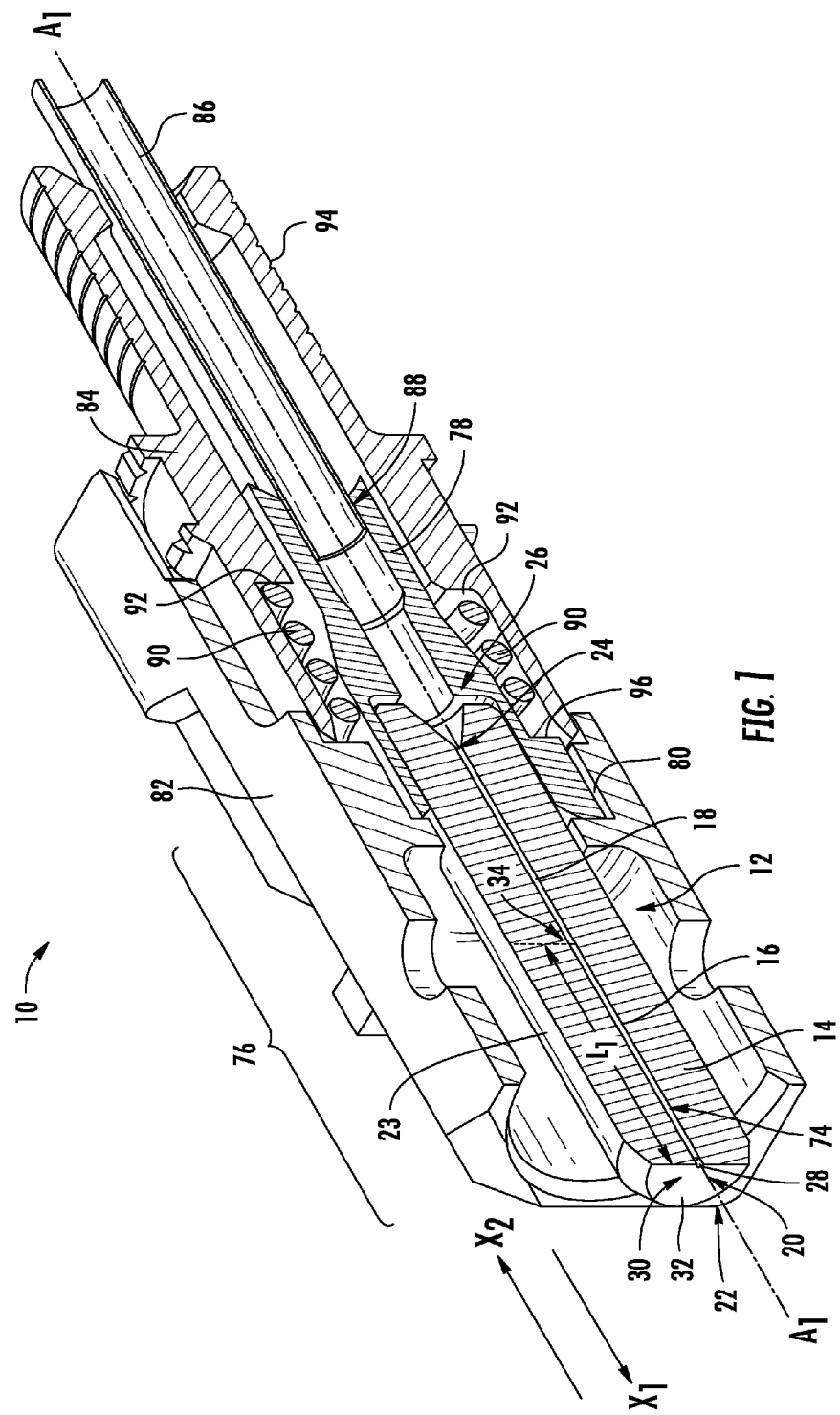
FIG. 1 is a right side, perspective, cross-sectional view of an exemplary, final assembled, pre-terminated fiber optic connector sub-assembly having an optical fiber stub disposed in a ferrule bore of a ferrule, with a rear end of the optical fiber stub disposed within the ferrule bore, wherein the rear end of the optical fiber stub is not directly accessible through a ferrule body of the ferrule bore and is configured to be fusion spliced to an end portion of a field optical fiber of a fiber optic cable to terminate the fiber optic connector sub-assembly on the end portion of the fiber optic cable.

Reference will now be made in detail to the embodiments, examples of which are illustrated in the accompanying drawings, in which some, but not all embodiments are shown. Indeed, the concepts may be embodied in many different forms and should not be construed as limiting herein. Whenever possible, like reference numbers will be used to refer to like components or parts.

Embodiments disclosed herein include pre-terminated fiber optic connector sub-assemblies. Related fiber optic connectors, cable assemblies, and methods are also disclosed. In certain embodiments, an optical fiber stub is pre-installed in a ferrule bore (also known as a "micro-hole") of the ferrule of a fiber optic connector sub-assembly, to provide the pre-terminated fiber optic connector sub-assembly. The optical fiber stub, which is shorter in length than the ferrule length, can be pre-installed in the ferrule bore of the ferrule, prior to termination of the fiber optic connector sub-assembly on a fiber optic cable. If the ferrule is a multi-fiber ferrule, multiple optical fiber stubs may be pre-installed in the ferrule. Because the pre-terminated optical fiber stub is not directly accessible through a ferrule body of the ferrule when a field optical fiber is disposed in the ferrule body to be fusion spliced with the optical fiber stub, the ferrule has properties that allow thermal energy to be directed through the ferrule body into the ferrule bore of the ferrule. In this manner, the pre-installed optical fiber stub(s) in the ferrule bore of the ferrule can be fusion spliced with another optical fiber(s) of a fiber optic cable to terminate the fiber optic cable. To terminate a fiber optic cable with the pre-terminated fiber optic connector sub-assembly, an end portion of an optical fiber from the fiber optic cable can be inserted into the rear end of the ferrule bore of the fiber optic connector sub-assembly and fusion spliced with a rear end of the pre-installed optical fiber stub disposed within the ferrule bore of the ferrule.

Providing a pre-terminated fiber optic sub-assembly that includes an optical fiber stub that can be fusion spliced within a ferrule bore of a ferrule, wherein the optical fiber stub is not directly accessible through the ferrule body outside of the ferrule bore openings, may be advantageous. As a non-limiting example, fusion splicing may provide an enhanced optical termination over mechanical splicing. Further, as another example, by providing a ferrule that has properties to allow thermal energy to be directed through the ferrule body into the ferrule bore of the ferrule, a fiber access opening or port beyond the ferrule bore is not required to be provided in the ferrule body. Providing a fiber access opening or port in the ferrule would expose the optical fiber stub outside of the ferrule bore during splicing.

Further, providing a pre-terminated fiber optic sub-assembly can allow highly automated fiber optic cable termination processes. As a non-limiting example, the pre-terminated fiber optic connector sub-assemblies disclosed herein can be assembled and prepared as a small and more easily automatable part, separately and independently from a fiber optic cable assembly. The pre-installed optical fiber stub extending from front end of the ferrule of a pre-terminated fiber optic connector sub-assembly can be prepared and polished to provide an optical end face on the ferrule, before being terminated on a fiber optic cable. The entire fiber optic cable assembly does not have to accompany the pre-terminated fiber optic connector sub-assembly during its preparation and assembly. The assembled and prepared pre-terminated fiber optic connector sub-assemblies can then be distributed within a factory or in the field, to be used to terminate and connectorize a fiber optic cable employing fusion splicing.

Also as another non-limiting example, the pre-terminated fiber optic connector sub-assemblies disclosed herein, being capable of assembly and preparation independent of fiber optic cable assembly processes, allows the pre-terminated fiber optic connector sub-assemblies to be prepared to desired specifications independent of the fiber optic cable assembly processes or cable type. This may allow processes for assembly and preparation of pre-terminate fiber optic connector sub-assemblies to not be specific to or limited by specific fiber optic cable assembly processes and/or cable types. The pre-terminated fiber optic connector sub-assemblies disclosed herein can also be tested prior to termination on a fiber optic cable. Thus, pre-terminated fiber optic connector sub-assemblies discovered as having flaws requiring rework or scrapping, will not add delay in independent fiber optic cable sub-assembly processes. Also, testing prepared optical end faces of ferrules in pre-terminated fiber optic connector sub-assemblies prior to termination on a fiber optic cable can reduce the risk of discovering a flaw only after termination and risking scrapping an entire fiber optic cable assembly. Providing pre-terminated fiber optic connector sub-assemblies may also allow improved termination efficiency of fiber optic cables by technicians in the field, because the pre-installed optical fiber stub and end face preparations can be performed prior to termination in a factory, according to highly automated and precise factory processes.

In this regard, FIG. 1 illustrates a pre-terminated fiber optic connector sub-assembly 10 according to one exemplary embodiment. FIG. 1 is a right side, perspective cross-sectional view of a finalized assembly of a pre-terminated fiber optic connector sub-assembly 10 to illustrate the components therein. The pre-terminated fiber optic connector sub-assembly 10 in FIG. 1 includes a ferrule assembly 12 supporting a ferrule 14. By the fiber optic connector sub-assembly 10 in FIG. 1 being "pre-terminated," it is meant that an optical fiber stub 16 is pre-installed in a ferrule bore 18 of the ferrule 14 to allow the pre-terminated fiber optic connector sub-assembly 10 to be prepared independently of a fiber optic cable assembly. The ferrule bore 18 is also known to as a "microbore" or "micro-hole." The optical fiber stub 16 is capable of being pre-installed in the ferrule bore 18 prior to the termination of the pre-terminated fiber optic connector sub-assembly 10 on a fiber optic cable to connectorize the fiber optic cable.

With continuing reference to FIG. 1, the ferrule bore 18 of the ferrule 14 extends from a front opening 20 at a front end 22 of a ferrule body 23 of the ferrule 14 to a rear opening 24 on a rear end 26 of the ferrule body 23 of the ferrule 14, opposite the front end 22 in this example. The front opening 20 or the front end 22 of the ferrule body 23 of the ferrule 14 may also be referred to herein as simply the front opening 20 of the ferrule 14 or the front end 22 of the ferrule 14. The rear opening 24 or the rear end 26 of the ferrule body 23 of the ferrule 14 may also be referred to herein as simply the rear opening 24 of the ferrule 14 or the rear end 26 of the ferrule 14. The pre-installed optical fiber stub 16 is disposed in the ferrule bore 18. A front end 28 of the optical fiber stub 16 extending from front end 22 of the ferrule body 23 of the ferrule 14 has been prepared and polished to provide an optical surface 30 in a front end face 32 in the front end 22 of the ferrule body 23 of the ferrule 14 for establishing an optical connection with another fiber optic connector mated to the pre-terminated fiber optic connector sub-assembly 10.

With continuing reference to FIG. 1, the length $L_1$ of the optical fiber stub 16 is selected such that a rear end 34 of the optical fiber stub 16 is disposed within the ferrule bore 18 without extending to the rear end 26 of the ferrule 14. The rear end 34 of the optical fiber stub 16 is configured to be fusion spliced within the ferrule bore 18 to an end portion of another optical fiber from a fiber optic cable (not shown), which may be referred to as a "field optical fiber," disposed through the rear opening 24 of the ferrule 14 and adjacent to the rear end 34 of the optical fiber stub 16. A field optical fiber is not limited to field installations; the field optical fiber can be terminated in a factory or other preparation locations. This fusion splicing terminates the pre-terminated fiber optic connector sub-assembly 10 on the fiber optic cable.

As will be discussed in more detail below, the ferrule 14 can include features that allow thermal energy to be directed through the ferrule body 23 to the ferrule bore 18. In this manner, fusion splicing can be provided as opposed to mechanical splicing. This thermal energy can be directed through the ferrule body 23 and into the ferrule bore 18 where a pre-terminated optical fiber stub 16 is disposed to be fusion spliced with a field optical fiber of a fiber optic cable to terminate the fiber optic cable. By allowing the thermal energy to be directed through the ferrule body 23 and into the ferrule bore 18, apart from the front opening 20 and rear opening 24 into the ferrule bore 18, the optical fiber stub 16 does not have to be directly accessible from outside the ferrule 14. In this manner as an example, the optical fiber stub 16 pre-installed in the ferrule bore 18 can be fusion spliced within the ferrule bore 18 without having to provide a separate fiber access opening or port through the ferrule body 23 to access the rear end of the optical fiber stub 16 for fusion splicing.

The rear end 34 of the optical fiber stub 16 in this embodiment resides within the ferrule bore 18 and does not extend to the rear opening 24 of the ferrule 14, so that the ferrule bore 18 facilitates securing and precise alignment of the rear end 34 of the optical fiber stub 16 and a front end of a field optical fiber inserted into the rear opening 24 of the ferrule 14 for fusion splicing. This passive alignment feature provided by the ferrule bore 18 may be particularly useful if the pre-terminated fiber optic connector sub-assembly 10 is terminated on a fiber optic cable in the field, such that additional alignment of the optical fiber stub 16 and/or a spliced field optical fiber from a fiber optic cable inserted into the ferrule bore 18 is not required.

In this manner, as a non-limiting example, the fiber optic cable does not have to accompany the pre-terminated fiber optic connector sub-assembly 10 during its preparation and assembly. The pre-terminated fiber optic connector sub-assembly 10 is capable of assembly and preparation independent of fiber optic cable assembly processes. The pre-terminated fiber optic connector sub-assembly 10 can be prepared to desired specifications independent of the fiber optic cable assembly processes or cable type. The pre-terminated fiber optic connector sub-assembly 10 can be prepared and polished to provide the optical surface 30 on the front end face 32 of the ferrule 14, before being terminated on a fiber optic cable.

Figure 4A:
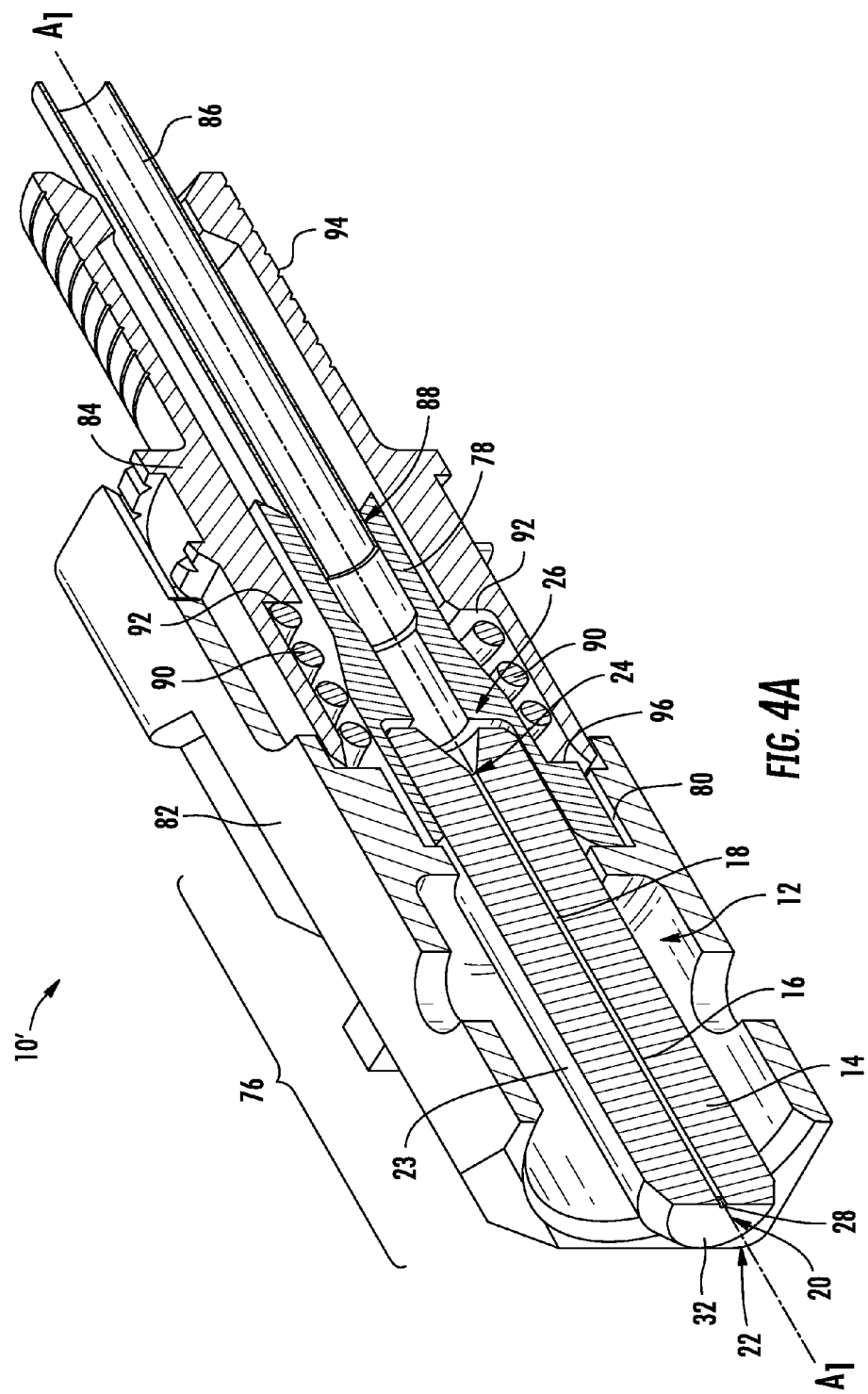
FIG. 4A is a right side, perspective, cross-sectional view of the fiber optic connector sub-assembly in FIG. 2, before the pre-terminated optical fiber stub is disposed in the ferrule bore of the ferrule.
Figure 4B:
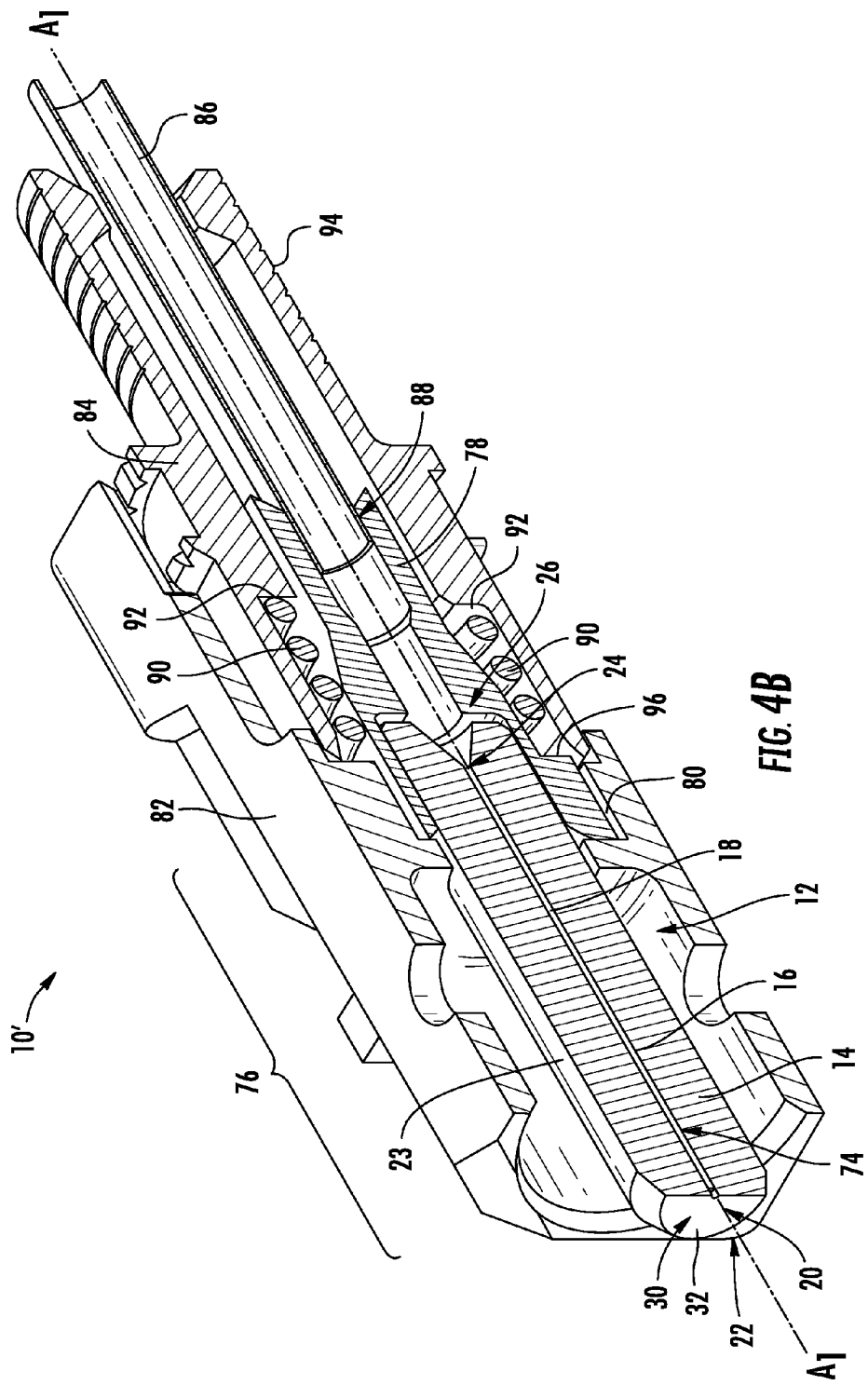
FIG. 4B is a right side, perspective, cross-sectional view of the fiber optic connector sub-assembly in FIG. 4A, with a bonding agent installed in the ferrule bore of the ferrule before the optical fiber stub is disposed in the ferrule bore of the ferrule.
Figures 1, 4C:
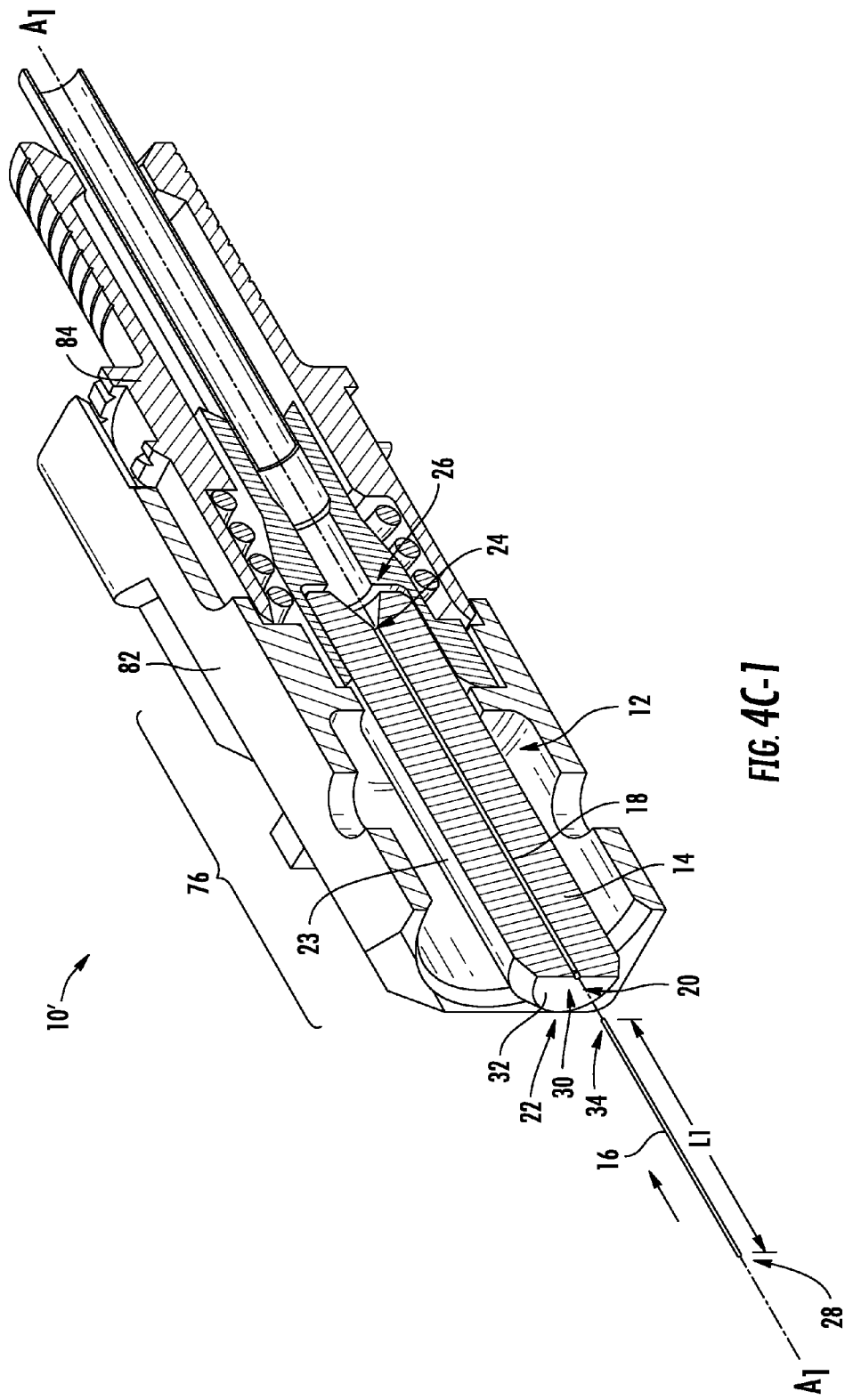
Figures 2, 4C:
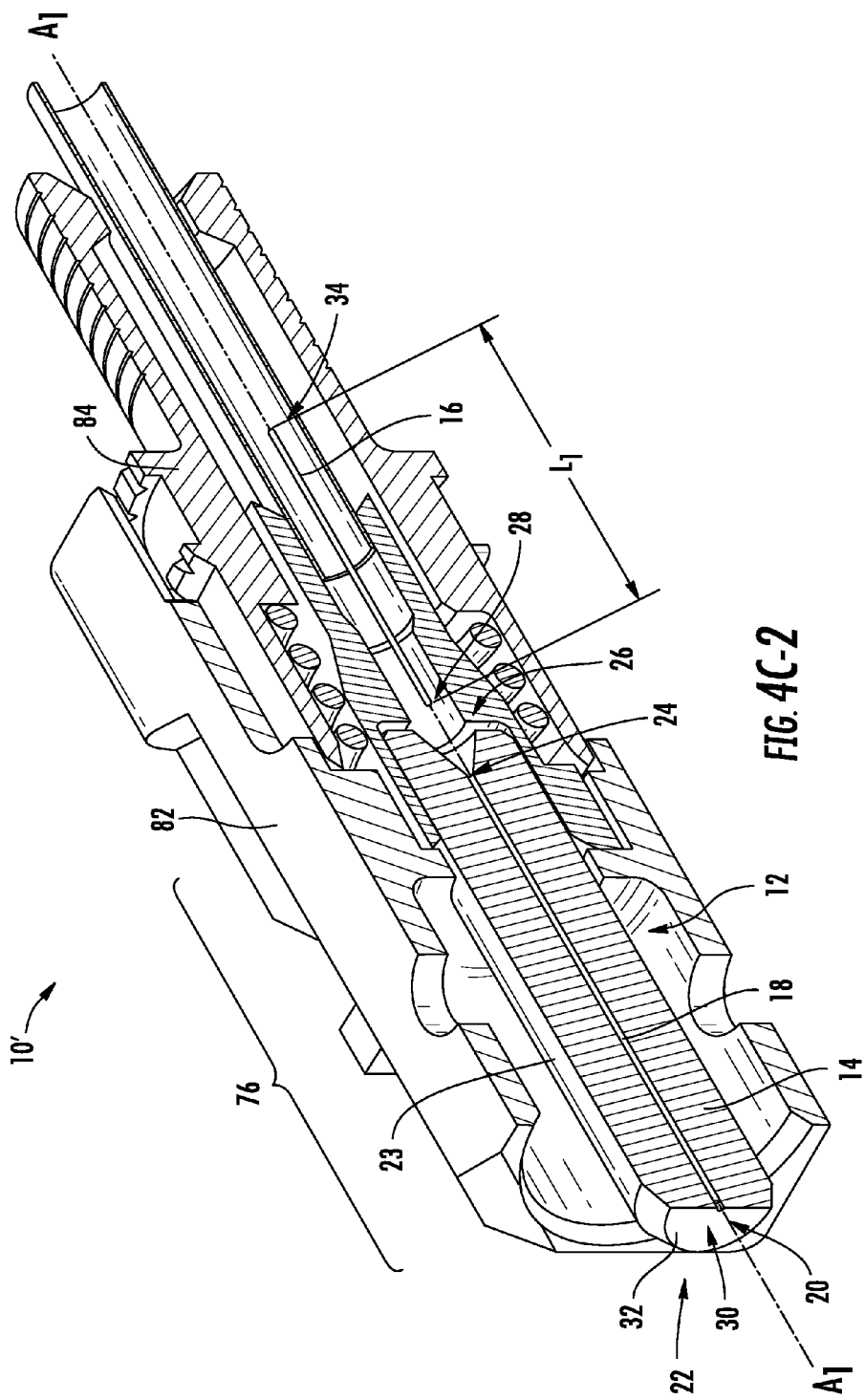

For comparison purposes, FIG. 2 is a cross-section view of a fiber optic cable assembly 36. The fiber optic cable assembly 36 includes a fiber optic connector sub-assembly 38 that is not pre-terminated. The fiber optic connector sub-assembly 38 does not include an optical fiber stub, like optical fiber stub 16 provided in the pre-terminated fiber optic connector sub-assembly 10 in FIG. 1. A ferrule 40 of the fiber optic connector sub-assembly 38 receives an end portion 42 of a fiber optic cable 44. The end portion 42 of the fiber optic cable 44 includes a coated optical fiber end portion 46 exposed from the cable jacket 48 of the fiber optic cable 44. A portion of the coating from coated optical fiber end portion 46 is removed to expose a bare optical fiber 50. To terminate the fiber optic connector sub-assembly 38 on the fiber optic cable 44, bare optical fiber 50 is inserted into the rear opening 52 and passageway 54 of the ferrule holder 56 of a ferrule assembly 58.

With continuing reference to FIG. 2, the bare optical fiber 50 is disposed through a rear opening 62 in a rear end 64 of the ferrule 40, into a ferrule bore 66 of the ferrule 40. The bare optical fiber 50 is extended through the ferrule bore 66 and out through a front opening 68 in a front end 70 of the ferrule 40, beyond the front end 70. An end portion 72 of the bare optical fiber 50 can be prepared and polished to form an optical surface in the front end 70 of the ferrule 40. Thus, unlike the pre-terminated fiber optic connector sub-assembly 10 in FIG. 1, in the fiber optic connector sub-assembly 38 in FIG. 2, the optical surface is prepared in the ferrule 40 when the fiber optic cable 44 is terminated as part of, and not independent of, a fiber optic cable assembly process. If the fiber optic cable 44 is terminated in the field, the process outlined above for the fiber optic connector sub-assembly 38 in FIG. 2 is performed in the field, which can be cumbersome and less precise over factory preparations.

Figure 3:
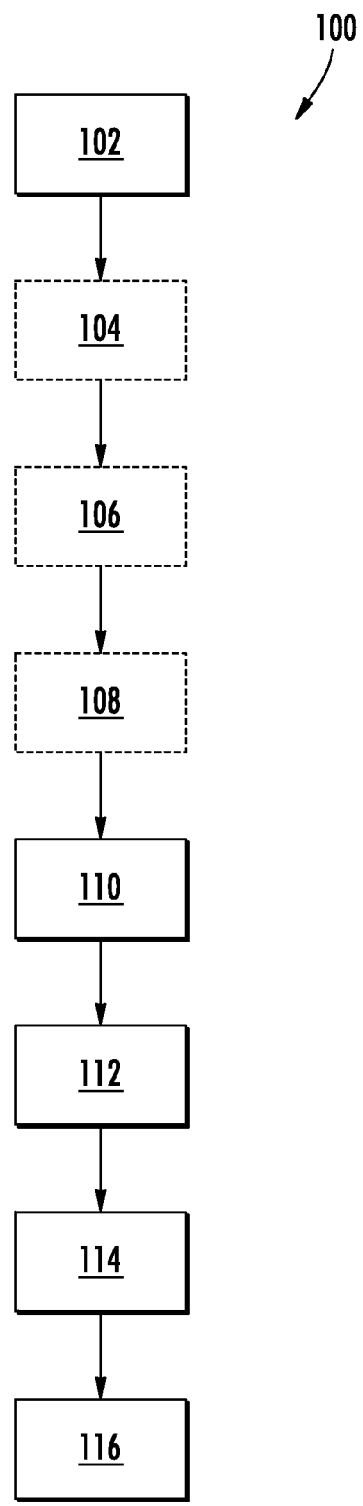
FIG. 3 is a flowchart illustrating an exemplary process for pre-installing the optical fiber stub within the ferrule bore of a fiber optic connector sub-assembly of FIG. 2, with a rear end of the optical fiber stub disposed within the ferrule bore, to provide a pre-terminated fiber optic connector sub-assembly.

Before further discussing more exemplary details of the pre-termination features of the pre-terminated fiber optic connector sub-assembles starting at FIG. 3, other exemplary components of the pre-terminated fiber optic connector sub-assembly 10 in FIG. 1 are briefly described. In this regard with reference back to the pre-terminated fiber optic connector sub-assembly 10 in FIG. 1, the ferrule 14 laterally and angularly aligns the front end 28 of the optical fiber stub 16 at the front end face 32 of the ferrule 14. The optical fiber stub 16 is disposed through the ferrule bore 18 that extends along the center optical axis $A_1$ of the ferrule 14. The optical fiber stub 16 can be inserted into the ferrule bore 18 either through the front opening 20 or the rear opening 24 of the ferrule 14. The rear opening 24 may be cone-shaped to provide easy entry of the optical fiber stub 16 or end portion of a field optical fiber inserted into the ferrule bore 18 to be fusion spliced with the rear end 34 of the optical fiber stub 16 within the ferrule bore 18.

As will be discussed in more detail below, prior to the optical surface 30 being formed in the front end face 32 of the ferrule 14, the front end 28 of the optical fiber stub 16 exits the ferrule bore 18 through the front opening 20 of the ferrule 14. The front end 28 of the optical fiber stub 16 extends past the front end 22 of the ferule 14 through the front opening 20 to an initial height before the optical surface 30 is formed. The optical fiber stub 16 may be secured within the ferrule bore 18 with a bonding agent 74. The bonding agent 74 may prevent movement of the optical fiber stub 16 within the ferrule bore 18 to minimize or avoid signal attenuation between the optical fiber stub 16 and an optical fiber optically connected to the front end 28 of the optical fiber stub 16 and/or the rear end 34 of the optical fiber stub 16.

With continuing reference to FIG. 1, the ferrule 14 may be disposed at a front end 76 of the pre-terminated fiber optic connector sub-assembly 10. The rear end 26 of the ferrule 14 is partially disposed within a ferrule holder body 78. The ferrule holder body 78 supports the ferrule 14 within the pre-terminated fiber optic connector sub-assembly 10. The ferrule holder body 78 may support the ferrule 14 so that the front end face 32 of the ferrule 14 is disposed orthogonal to the optical axis $A_1$, as shown in FIG. 1, or angled with respect to the optical axis $A_1$ (not shown in FIG. 1). The ferrule holder body 78 may include a body alignment surface 80 to allow easy insertion of the ferrule holder body 78 within a connector sub-assembly housing 82 of the pre-terminated fiber optic connector sub-assembly 10. The connector sub-assembly housing 82 in this embodiment includes an inner housing 84. The rear end 26 of the ferrule 14 may be at least partially disposed within the inner housing 84. It is noted that the ferrule holder body 78 may also be used in other fiber optic connectors without an inner housing, for example, non-SC type fiber optic connectors.

With continuing reference to FIG. 1, the pre-terminated fiber optic connector sub-assembly 10 may also include a lead-in tube 86 engaged to a rear end 88 of the ferrule holder body 78 to facilitate alignment of a field optical fiber to be inserted in the rear opening 24 of the ferrule 14 into the ferrule bore 18 to be fusion spliced with the rear end 34 of the optical fiber stub 16 disposed in ferrule bore 18. The lead-in tube 86 can also restrict a location of a bonding agent used during installation of an external field optical fiber and prevents the bonding agent from escaping. Otherwise, the bonding agent may come into contact with other areas of the pre-terminated fiber optic connector sub-assembly 10, such as a spring (discussed below), which must be free to move unfettered by the bonding agent.

With continuing reference to FIG. 1, a spring 90 may be disposed between a spring seat base 92 of a crimp body 94 attached to the inner housing 84 and a spring seating surface 96 of the ferrule holder body 78. The spring 90 in this example is biased to apply a spring force to the spring seating surface 96 to push the ferrule holder body 78 in the forward direction $X_1$, and thereby push the front end face 32 of the ferrule 14 against a complementary receptacle. When contact is made between the front end face 32 of the ferrule 14 and a complementary receptacle, the ferrule holder body 78 translates in the rear direction $X_2$, and the force will press the front end face 32 against a complementary receptacle to minimize attenuation.

A process can be employed to provide the pre-terminated fiber optic connector sub-assembly 10 in FIG. 1. As discussed above, the process to provide the pre-terminated fiber optic connector sub-assembly 10 can be provided independent and separate from a fiber optic cable assembly process and/or fiber optic cable termination process. In this regard, FIG. 3 is a flowchart illustrating an exemplary process 100 for providing the pre-terminated fiber optic connector sub-assembly 10 in FIG. 1. The process in FIG. 3 will be discussed in conjunction with process steps illustrated in FIGS. 4A-4D.

With reference to FIG. 3, the process starts by providing a fiber optic connector sub-assembly 10' as illustrated in FIG. 4A (block 102 in FIG. 3). The fiber optic connector sub-assembly 10' is the pre-terminated fiber optic connector sub-assembly 10 in FIG. 1, before pre-termination with the optical fiber stub 16. Common components between the fiber optic connector sub-assembly 10' in FIG. 4A and the pre-terminated fiber optic connector sub-assembly 10 in FIG. 1 are shown with common element numbers in FIG. 4A, and will not be re-described here.

With reference back to FIG. 3, a next optional step can be to provide the bonding agent 74 in the ferrule bore 18 of the fiber optic connector sub-assembly 10' (block 104 in FIG. 3). This step is illustrated in FIG. 4B. As discussed previously, the bonding agent 74 may be disposed in the ferrule bore 18 to secure the optical fiber stub 16 within the ferrule bore 14. The bonding agent 74 may prevent movement of the optical fiber stub 16 within the ferrule bore 18 to minimize or avoid signal attenuation between the optical fiber stub 16 and a field optical fiber optically connected to the front end 28 of the optical fiber stub 16 and/or the rear end 34 of the optical fiber stub 16. The bonding agent 74 may be an epoxy, as a non-limiting example. Other examples of bonding agents that can be used as the bonding agent 74 include, but are not limited to thermoplastic agents, thermoplastic/epoxy blend agents, thermosetting agents, inorganic bonding agents.

The bonding agent 74 could be disposed on the optical fiber stub 16 before insertion into the ferrule bore 18, to dispose the bonding agent 74 in the ferrule bore 18 to secure optical fiber stub 16 in the ferrule bore 18. Alternatively or in addition, the bonding agent 74 could be disposed on the optical fiber stub 16 during insertion into the ferrule bore 18, such as proximate to the front opening 20 or rear opening 24 of the ferrule 14 depending on which opening the optical fiber stub 16 is inserted, to dispose the bonding agent 74 in the ferrule bore 18 to secure optical fiber stub 16 in the ferrule bore 18. Alternatively or in addition, the bonding agent 74 could be disposed on the optical fiber stub 16 before the ferrule bore 18, to dispose the bonding agent 74 in the ferrule bore 18 to secure optical fiber stub 16 in the ferrule bore 18.

The ferrule bore 18 of the ferrule 14 in the fiber optic connector sub-assembly 10' in FIG. 4B is ready to receive the optical fiber stub 16. However, as another optional step, the ferrule assembly 12 may be heated before the optical fiber stub 16 is inserted in the ferrule bore 18 of the ferrule 14 (block 106 in FIG. 3) if the bonding agent 74 was disposed in the ferrule bore 18 (block 104 in FIG. 3). The fiber optic connector sub-assembly 10' may be inserted into an oven or exposed to a heating device to heat the ferrule assembly 12 and the ferrule 14. Heating the ferrule 14 raises the temperature of the bonding agent 74 disposed in the ferrule bore 18 of the ferrule 14 so that the optical fiber stub 16 can be installed in the ferrule bore 14 without the bonding agent 74 hardening too fast. As will be discussed below, optical fiber stub 16 can be inserted into the ferrule bore 18 of the ferrule 14 while the ferrule 14 is being heated or shortly after the ferrule 14 is no longer exposed to a heating device (block 108 in FIG. 3), before the ferrule 14 has had time to cool off back to room temperature. After the optical fiber stub 16 is inserted in the ferrule bore 18 and the rear end 34 of the optical fiber stub 16 is properly positioned about the front end 22 of the ferrule 14, the natural cooling off process of the ferrule 14 being removed from exposure to a heating device will cause the bonding agent 74 to cool and harden about the optical fiber stub 16 within the ferrule bore 18 to secure the optical fiber stub 16 and the location of the rear end 34 of the optical fiber stub 16 within the ferrule bore 18.

Whether the ferrule 14 of the fiber optic connector sub-assembly 10' in FIG. 4B is pre-heated or not, the optical fiber stub 16 can be disposed in the ferrule bore 18 of the ferrule 14 (block 110 in FIG. 3) to create the pre-terminated fiber optic connector sub-assembly 10 in FIG. 1 from the fiber optic connector sub-assembly 10' in FIG. 4B. Exemplary processes of disposing the optical fiber stub 16 in the ferrule bore 18 are illustrated in FIGS. 4C-1 and 4C-2. FIG. 4C-1 illustrates the optical fiber stub 16 readied to be disposed through the front opening 20 in the front end 22 of the ferrule 14 to be disposed into the ferrule bore 18 of the ferrule 14 in one embodiment. In an alternative embodiment illustrated in FIG. 4C-2, the optical fiber stub 16 can be inserted through the rear opening 24 in the rear end 26 of the ferrule 14 to be disposed in the ferrule bore 18 of the ferrule 14.

Figure 4D:
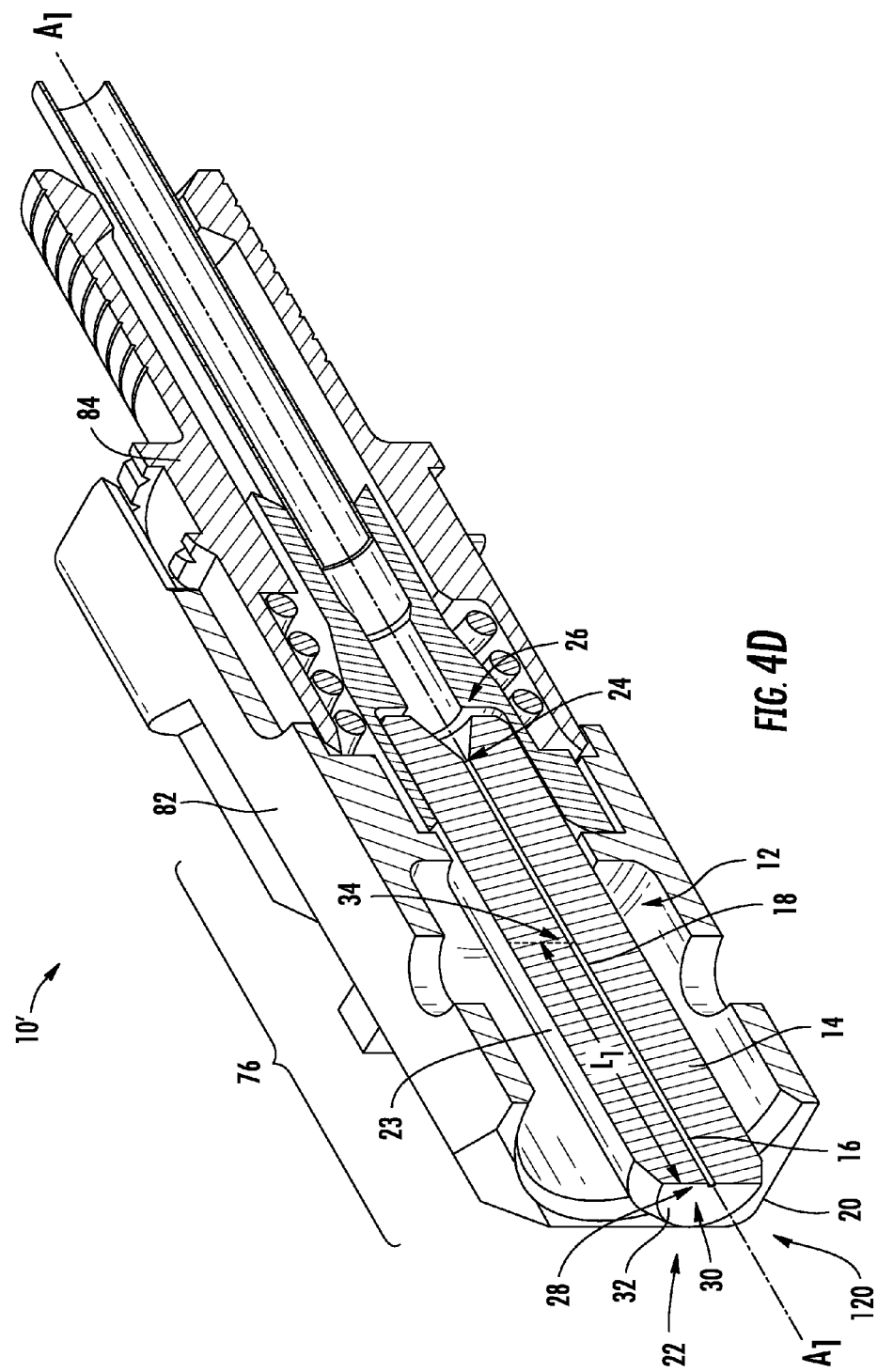
FIG. 4D is a right side, perspective, cross-sectional view of the fiber optic connector sub-assembly in FIG. 4B pre-terminated with an optical fiber stub disposed in a ferrule bore of a ferrule, with a rear end of the optical fiber stub disposed within the ferrule bore, prior to preparing and polishing the front end of the optical fiber stub and ferrule to prepare an optical end face in the front end of the ferrule.

With reference to FIG. 4C-1, the optical fiber stub 16 can be pre-prepared and cut to the desired length $L_1$ before insertion into the ferrule bore 18. For example, length $L_1$ of the optical fiber stub 16 may be at least 0.25 millimeters (mm), including 0.5 mm as non-limiting examples. Alternatively, by inserting the optical fiber stub 16 through the front opening 20 in the front end 22 of the ferrule 14, the optical fiber stub 16 can be provided as part of a longer optical fiber. After the rear end 34 of the optical fiber stub 16 is inserted into the desired location from the front end 22 of the ferrule 14 within the ferrule bore 18, the optical fiber stub 16 can be cleaved a distance away from the front end face 32 of the ferrule 14 to create the optical fiber stub 16 (block 112 in FIG. 3). In this manner, the cleaving process to create the optical fiber stub 16 does not have to be performed as a prior, separate process before insertion into the ferrule bore 18. The optical fiber stub 16 could be inserted in the front opening 20 in the front end 22 of the ferrule 14 before the ferrule 14 is assembled as part of the ferrule assembly 12, if desired. After cleaving, an end portion 120 of the optical fiber stub 16 remains extending beyond the front opening 20 of the front end 22 of the ferrule 14 at a desired and/or present distance (e.g., 500 µm) away from the front end face 32 of the ferrule 14, as illustrated in FIG. 4D. The end portion 120 of the optical fiber stub 16 can subsequently be prepared and polished to form the front end 28 of the optical fiber stub 16 in an optical surface 30 in the front end face 32 of the ferrule 14 to create the final optical fiber stub 16 (block 112 in FIG. 3).

For the embodiment shown in FIG. 4C-2, the optical fiber stub 16 can be pre-prepared and cut to the desired length before insertion into the ferrule bore 18. The optical fiber stub 16 could be inserted in the rear opening 24 in the rear end 26 of the ferrule 14 before the ferrule 14 is assembled as part of the ferrule assembly 12, if desired. After the rear end 34 of the optical fiber stub 16 is inserted into the desired location from the rear end 26 of the ferrule 14 within the ferrule bore 18, the length $L_1$ of the optical fiber stub 16 can be selected such that an end portion 120 of the optical fiber stub 16 extends through the front opening 20 of the front end 22 of the ferrule 14 a desired and/or present distance (e.g., 500 μm) away from the front end face 32 of the ferrule 14, as illustrated in FIG. 4D. The end portion 120 of the optical fiber stub 16 can subsequently be prepared and polished to form the front end 28 of the optical fiber stub 16 in an optical surface 30 in the front end face 32 of the ferrule 14 to create the final optical fiber stub 16 (block 112 in FIG. 3).

The end portion 120 of the optical fiber stub 16 can be laser processed to form the optical surface 30 in the front end face 32 of the ferrule 14 in any manner desired. For example, U.S. patent application Ser. No. 13/769,546, filed on Feb. 18, 2013 and entitled "Thermally Forming Optical Surfaces In Ferrule Assemblies Of Fiber Optic Connectors, And Related Components and Methods," incorporated herein by reference in its entirety, describes a process to prepare an optical surface 30 on the end face of a ferrule. In this example, the ferrule 14 of the fiber optic connector sub-assembly 10' would be transmissive or substantially transmissive to one or more wavelengths of a laser beam emitted by a laser to thermally form the optical surface 30 in the front end face 32 of the ferrule 14. The one or more wavelengths of the laser beam emitted by the laser would be absorptive or substantially absorptive to the optical fiber stub 16. In this example, the optical surface 30 could be created by thermal forming involving a conversion of solids to liquids and gases encompassing melting and/or ablation. The transfer of energy from a laser beam powers the thermal forming of the optical surface 30 where the material of the front end 28 of the optical fiber stub 16 may ablate or melt and reflow before cooling to form the optical surface 30. A surface tension of the melted material during reflow and cooling forms a planar-shaped or substantially planar-shaped optical surface 30 relatively free of optical defects.

As another non-limiting example, the ferrule 14 could be comprised of a Zirconium Oxide ($ZrO_2$) material and the optical fiber stub 16 comprised of a Silicon Oxide ($SiO_2$) or Silica material, which are transmissive and absorptive, respectively, of wavelengths from a carbon dioxide ($CO_2$) laser and a carbon monoxide (CO) laser. The optical surface 30 could be created by thermal forming involving a conversion of solids to liquids and gases encompassing melting and/or ablation. The transfer of energy from a laser beam powers the thermal forming of the optical surface 30 where the material of the front end 28 of the optical fiber stub 16 may ablate or melt and reflow before cooling to form the optical surface 30. A surface tension of the melted material during reflow and cooling forms a planar-shaped or substantially planar-shaped optical surface 30 relatively free of optical defects.

Another example of laser processing that could be employed to form the optical surface 30 in the front end face 32 of the ferrule 14 is described in U.S. patent application Ser. No. 13/769,541, filed on Feb. 18, 2013 and entitled "Simultaneous Thermal Forming Of Ferrule And Optical Fiber In A Ferrule Assembly To Thermally Form An Optical Surface In The Ferrule Assembly, and Related Fiber Optic Components, Fiber Connectors, Assemblies, and Methods," which is incorporated herein by reference in its entirety. Therein, a thermally forming process is described using wavelength energy from a laser that can be employed to simultaneously thermally form the front end face 32 of the ferrule 14 and the front end 28 of the optical fiber stub 16 into the optical surface 30. The ferrule 14 and optical fiber stub 16 compositions are selected such that wavelength or wavelength range of the laser beam emitted by the laser is absorptive to both the ferrule 14 and the optical fiber stub 16, both having the same or similar thermal energy absorption characteristics at the wavelength or wavelength range of the laser beam. As a non-limiting example, both the ferrule 14 and optical fiber stub 16 could be comprised of at least a portion of a Silicon Oxide ($SiO_2$) or Silica based material, to be absorptive of the same laser beam wavelengths. Thus, when the front end face 32 of the ferrule 14 and the end portion 120 of the optical fiber stub 16 extending from the front end 22 of the ferrule 14 are simultaneously exposed to one or more wavelengths of a laser beam emitted by a laser, at least a portion of the front end face 32 of the ferrule 14 and the front end 28 of the optical fiber stub 16 are both thermally formed to form the optical surface 30 in the front end face 32 of the ferrule 14.

Once the optical surface 30 is formed in the front end face 32 of the ferrule 14, the final optical fiber stub 16 is provided in the fiber optic connector sub-assembly 10'. The fiber optic connector sub-assembly 10' becomes the pre-terminated fiber optic connector sub-assembly 10 (block 114 in FIG. 3). The pre-terminated fiber optic connector sub-assembly 10 can be tested, if desired, to ensure that the optical surface 30 formed in the front end face 32 of the ferrule 14 is acceptable (block 116 in FIG. 3). For example, a Cartesian plot of the exemplary height and curvature of the optical surface 30 could be provided for analysis. As another example, a three-dimensional (3-D) interferometric plot of the exemplary height and curvature of the optical surface 30 could be provided for analysis.

Figure 5:
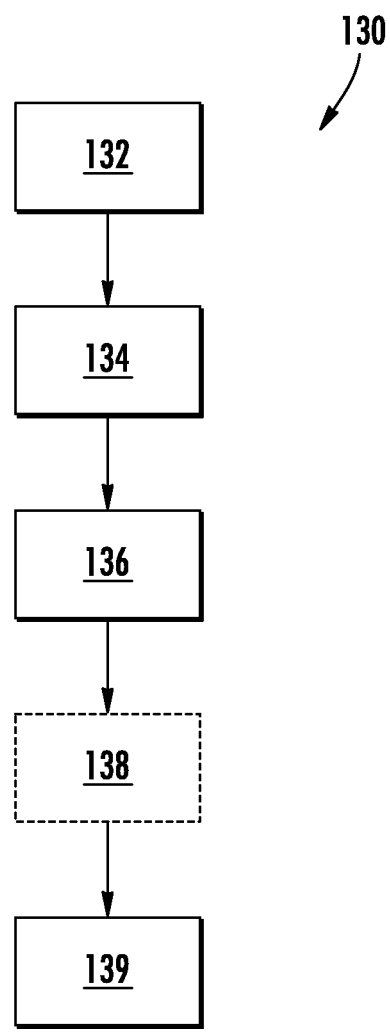
FIG. 5 is a flowchart illustrating an exemplary process for fusion splicing the pre-installed optical fiber stub disposed within the ferrule bore of the ferrule of the pre-terminated fiber optic connector sub-assembly of FIG. 2 to a field optical fiber of a fiber optic cable, to terminate the pre-terminated fiber optic connector sub-assembly on the end portion of the fiber optic cable to provide a terminated fiber optic cable assembly.

As previously discussed above, the pre-terminated fiber optic connector sub-assembly 10 allows fusion splicing of the optical fiber stub 16 within the ferrule bore 18 of the ferrule 14 to terminate the pre-terminated fiber optic connector sub-assembly 10 on a fiber optic cable. Now that the exemplary process of preparing the pre-terminated fiber optic connector sub-assembly 10 in FIG. 1 has been described, the process to fusion splice, within the ferrule bore 18 of the ferrule 14, the rear end 34 of the optical fiber stub 16 to a field optical fiber inserted into the ferrule bore 18 will now be described. In this regard, FIG. 5 is a flowchart illustrating an exemplary fiber optic connector sub-assembly termination process 130 for fusion splicing the pre-installed optical fiber stub 16 disposed within the ferrule bore 18 of the ferrule 14 of the pre-terminated fiber optic connector sub-assembly 10 of FIG. 1, to a field optical fiber of a fiber optic cable inserted into the ferrule bore 18. Fusion splicing the optical fiber stub 16 disposed within the ferrule bore 18 of the ferrule 14 to a field optical fiber inserted into the ferrule bore 18 can be provided as part of a process to terminate the pre-terminated fiber optic connector sub-assembly 10 on a fiber optic cable to provide a terminated fiber optic cable assembly. The exemplary process 130 in FIG. 5 will be described in conjunction with FIGS. 6-8B.

Figure 6:
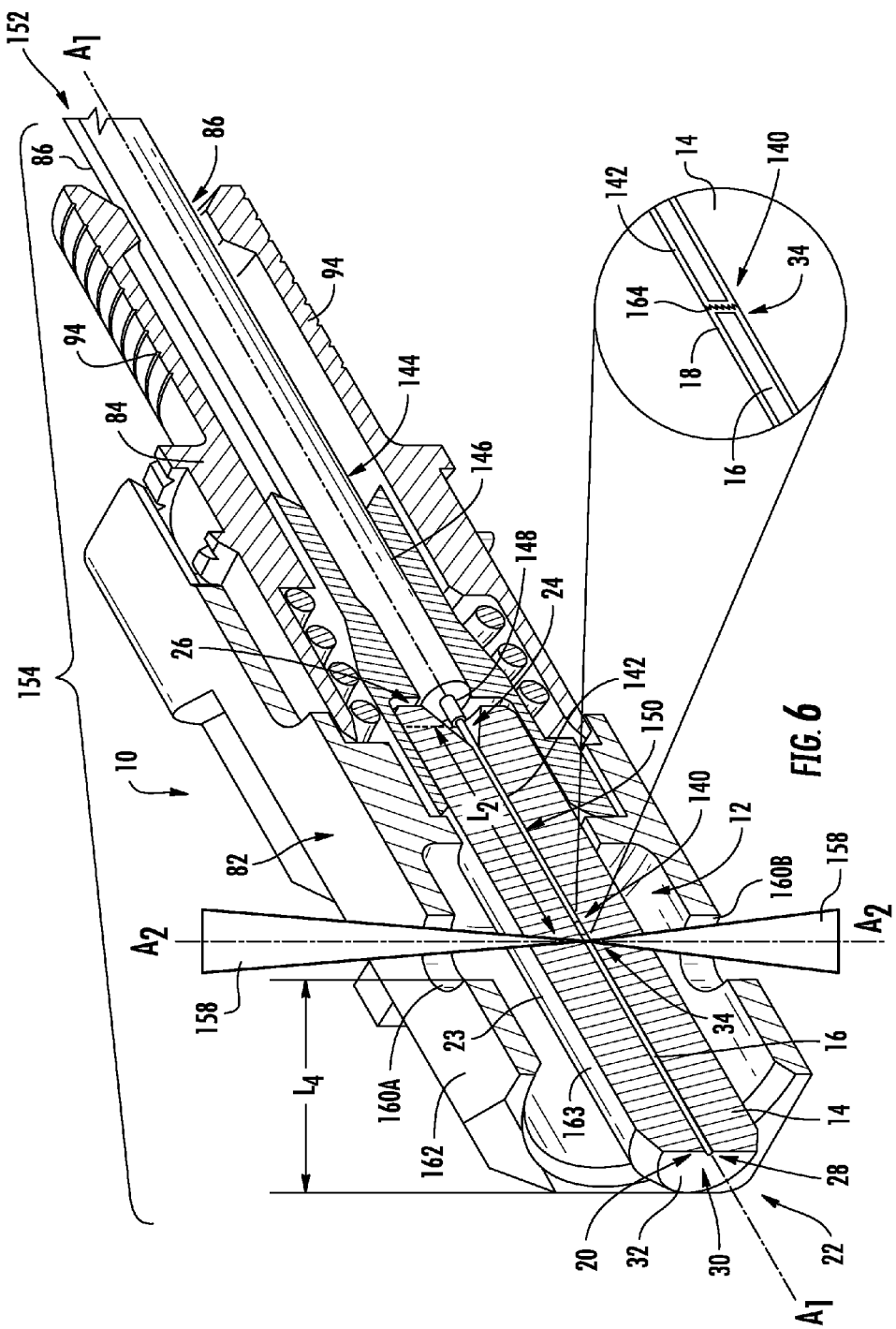
FIG. 6 is a right side, perspective, cross-sectional view of the pre-installed optical fiber stub of the pre-terminated fiber optic connector sub-assembly in FIG. 2, being laser fusion spliced to a front end of a field optical fiber of a fiber optic cable disposed in the ferrule bore adjacent to the rear end of the optical fiber stub in the ferrule bore.

In this regard, and with reference to FIGS. 6-8B, the fiber optic connector sub-assembly termination process 130 begins by providing a pre-terminated fiber optic connector sub-assembly 10 (block 132 in FIG. 5). This pre-terminated fiber optic connector sub-assembly 10 was previously described above and illustrated in FIG. 1. Next a front end 140 of a field optical fiber 142 from a fiber optic cable 144 is inserted into the ferrule bore 18 of the ferrule 14 to be located adjacent to the rear end 34 of the optical fiber stub 16 of the pre-terminated fiber optic connector sub-assembly 10, as shown in FIG. 6 (see also, block 134 in FIG. 5). The front end 140 of the field optical fiber 142 inserted into the ferrule bore 18 of the ferrule 14 and located adjacent to the rear end 34 of the optical fiber stub 16 of the pre-terminated fiber optic connector sub-assembly 10 is illustrated in FIG. 6. More specifically, prior to this insertion the cable jacket 146 of the fiber optic cable 144 is stripped back to expose a coated portion 148 of the field optical fiber 142 with the coating removed from the end portion 150 of the field optical fiber 142. The length $L_2$ of the end portion 150 of the field optical fiber 142 is provided in the fiber optic cable 144 preparations based on the preset location of the rear end 34 of the optical fiber stub 16 disposed in the ferrule bore 18 of the ferrule 14. The fiber optic cable 144 with the end portion 150 of the field optical fiber 142 provided is then inserted through a front opening 152 of the lead-in tube 86. The end portion 150 of the field optical fiber 142 is guided to be inserted through the rear opening 24 in the rear end 26 of the ferrule 14, into the ferrule bore 18 of the ferrule 14. The front end 140 of the end portion 150 of the field optical fiber 142 is moved forward in the ferrule bore 18 until the front end of the end portion 150 of the field optical fiber 142 is located adjacent to the rear end 34 of the optical fiber stub 16 to prepare for fusion splicing.

Next, the rear end 34 of the optical fiber stub 16 is fusion spliced to the adjacently located front end 140 of the end portion 150 of the field optical fiber 142 disposed within the ferrule bore 18 of the ferrule 14 of the pre-terminated fiber optic connector sub-assembly 10 (block 136 in FIG. 5). A non-limiting example of fusion splicing the rear end 34 of the optical fiber stub 16 to the front end 140 of the field optical fiber 142 is also illustrated in FIG. 6. In this example, the rear end 34 of the optical fiber stub 16 is shown being laser fusion spliced, to the front end 140 of a field optical fiber 142. When the rear end 34 of the optical fiber stub 16 is fusion spliced to the front end 140 of the field optical fiber 142 of the fiber optic cable 144, the pre-terminated fiber optic connector sub-assembly 10 is terminated on the fiber optic cable 144 to form a fiber optic cable assembly 154, as illustrated in FIG. 6.

With continuing reference to FIG. 6, the rear end 34 of the optical fiber stub 16 is fusion spliced to the front end 140 of the field optical fiber 142 by a laser beam 158 emitted by a laser. In this regard, in this embodiment, ferrule access openings 160A, 160B are disposed in a body 162 of the connector sub-assembly housing 82 to provide access for the laser beam 158 to be emitted onto an outer surface 163 of the ferrule 14. The ferrule access openings 160A, 160B are centered disposed about a center vertical axis $A_2$ intersecting or closely intersecting the ferrule bore 18 at or close to the location of the rear end 34 of the optical fiber stub 16 and the front end 140 of the field optical fiber 142 disposed in the ferrule bore 18. In this manner, the laser beam 158 emitted towards the ferrule access openings 160A, 160B can reach the rear end 34 of the optical fiber stub 16 and the front end 140 of the field optical fiber 142 to fuse the two ends 34, 140 together to provide an optical fusion splice 164. The ferrule access openings 160A, 160B may be disposed in the body 162 of the connector sub-assembly housing 82 a length $L_4$ from the front end 22 of the ferrule 14, which may be 2.0 mm in one example.

As previously discussed, the ferrule bore 18 of the ferrule 14 where the rear end 34 of the optical fiber stub 16 is located is not directly accessible from outside the ferrule 14 through the ferrule body 23 when pre-installed in the ferrule bore 18 and the field optical fiber 142 is disposed in the ferrule bore 18. The optical fiber stub 16 disposed in the ferrule bore 18 is not physically accessible through the ferrule body 23 of the ferrule 14 in this embodiment. For example, in this embodiment, the ferrule body 23 has a continuous cross-section that prevents direct physical access through the ferrule body 23 to the ferrule bore 18, other than through front opening 20 and rear opening 24 of the ferrule 14. But, the front opening 20 and rear opening 24 of the ferrule 14 are occluded when the optical fiber stub 16 is pre-installed in the ferrule bore 18 and the field optical fiber 142 is disposed in the ferrule bore 18 ready to be spliced with the optical fiber stub 16. However, it is desired to fusion splice the pre-installed optical fiber stub 16 with the field optical fiber 142 inside the ferrule bore 18 of the ferrule 14.

In this regard with reference to FIG. 6, the thermal energy of the laser beam 158 can directed through the ferrule body 23 to reach and be localized in the ferrule bore 18 in this embodiment. In this embodiment, the ferrule body 23 is provided of a material composition that is transmissive or substantially transmissive to one or more wavelengths of the laser beam 158. The optical fiber stub 16 and field optical fiber 142 are provided of a material composition that is absorptive or substantially absorptive to one or more wavelengths of the laser beam 158. In this manner, the thermal energy of the laser beam 158 is transmitted through the ferrule 14 and into the ferrule bore 18, and is absorbed by the rear end 34 of the optical fiber stub 16 and the front end 140 of the field optical fiber 142 to form an optical fusion splice 164 between the two ends 34, 140, as illustrated in FIG. 6. In this manner, fusion splicing is available to splice the pre-terminated optical fiber stub 16 with the field optical fiber 142 without having to provide a separate fiber access opening or port in the ferrule body 23.

Figure 7:
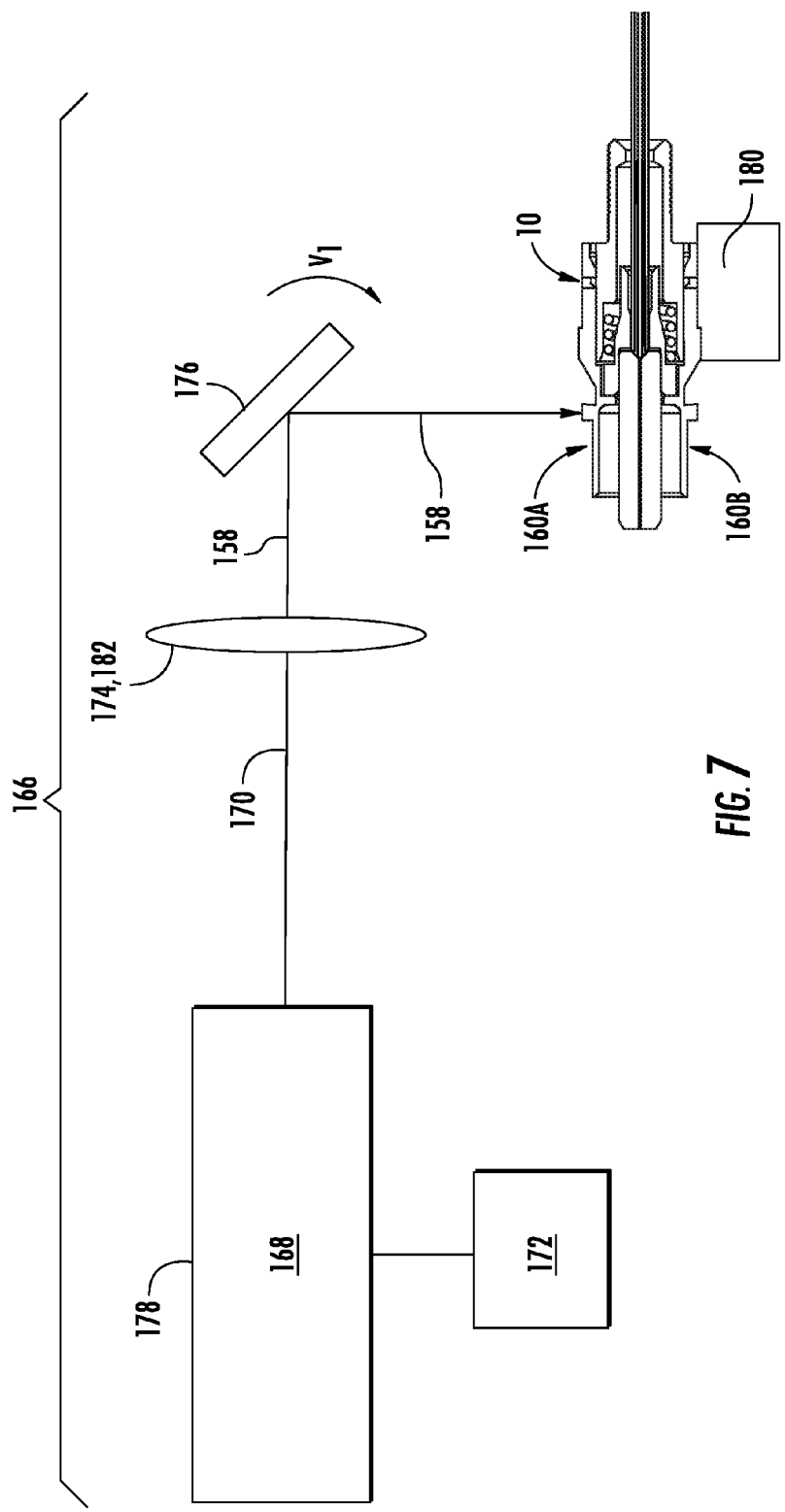
FIG. 7 is an exemplary laser processing apparatus comprising a laser configured to emit a laser beam towards the ferrule of the pre-terminated fiber optic connector sub-assembly in FIG. 2, to laser fusion splice the rear end portion of the optical fiber stub to a front end of a field optical fiber of a fiber optic cable disposed in the ferrule bore adjacent to the rear end of the optical fiber stub in the ferrule bore, to provide a terminated fiber optic cable assembly.

A laser processing apparatus can be provided to emit the laser beam 158 to form the optical fusion splice 164 between the rear end 34 of the optical fiber stub 16 and the front end 140 of the field optical fiber 142 in the fiber optic cable assembly 154 in FIG. 6. In this regard, FIG. 7 illustrates an exemplary laser processing apparatus 166 that can be used to emit the laser beam 158 to form the optical fusion splice 164 in the fiber optic cable assembly 154 in FIG. 6. The laser processing apparatus 166 comprises a laser 168 configured to emit a laser beam 170 having a wavelength or wavelength range towards the ferrule access openings 160A, 160B in the pre-terminated fiber optic connector sub-assembly 10 in FIG. 6. The laser 168 is controlled by a controller 172 to emit the laser beam 170. The laser processing apparatus 166 in this example includes the laser 168, and optionally at least one focusing lens 174, and at least one steering mirror 176. The laser 168 is supported by a fixture 178. The pre-terminated fiber optic connector sub-assembly 10 is supported by fixture 180.

With continuing reference to FIG. 7, the laser 168 emits the laser beam 158 in a wavelength or wavelength range that is transmissive or substantially transmissive to the ferrule 14 and absorptive or substantially absorptive to the optical fiber stub 16 and the field optical fiber 142. The laser 168 can be modified or chosen to purposefully emit the laser beam 170 at one or more wavelengths that are transmissive or substantially transmissive to the material composition of the ferrule 14 and absorptive or substantially absorptive to the optical fiber stub 16 and field optical fiber 142, as previously discussed above.

With continuing reference to FIG. 7, the focusing lens 174 focuses the laser beam 170 to a smaller focused laser beam 158 to concentrate the wavelength energy of the laser beam 170 to be efficiently directed to the ferrule 14 of the pre-terminated fiber optic connector sub-assembly 10. Providing the laser beam 170 into a concentrated laser beam 158 having a concentrated width may accelerate the melting or ablation of the rear end 34 of the optical fiber stub 16 with the front end 140 of the field optical fiber 142 to form the optical fusion splice 164 therebetween in the ferrule bore 18 of the ferrule 14. The focusing lens 174 may be made of a high-grade optical material, such as calcium fluoride (CaF) or zinc selenide (ZnSe) as non-limiting examples. For purposes of comparison, an exemplary width or diameter of the optical fiber stub 16 and field optical fiber 142 may be one-hundred twenty-five (125) μm. The laser beam 170 with a wavelength in the range of 5,500 nm may be provided and may be focused by the focusing lens 174 to an exemplary width of 5.5 μm to provide laser beam 158.

With continuing reference to FIG. 7, the steering mirror 176 steers or direct the emitted laser beam 158 towards the pre-terminated fiber optic connector sub-assembly 10. The steering mirror 176 may be a one-dimensional (1-D) scanner, which translates back and forth along a velocity vector $V_1$, thereby causing the laser beam 158 to be directable. Alternatively, the steering mirror 176 may be a galvanometer one dimensional (1-D) scanner. The steering mirror 176 may steer or direct the emitted laser beam 158 towards ferrule access openings 160A, 160B of the pre-terminated fiber optic connector sub-assembly 10.

As an alternative to controlling the laser beam 170 in the laser processing apparatus 166 in FIG. 7, the energy distribution of the laser beam 170 may be shaped by a diffractive optic 182 in place of the focusing lens 174 and steering mirror 176. The diffractive optic can control the energy distribution of the laser beam 158. As a non-limiting example, a diffractive optic 182 can be manufactured from Zirconia Selenium (ZnSe). The controller 172 can control the laser 168 to emit and not emit the laser beam 170 on and off without needing to translate the laser beam 170 or the ferrule 14 of the pre-terminated fiber optic connector sub-assembly 10. The laser 168 and the diffractive optic 182 can be sized to match the desired energy distribution to thermally form and polish the optical surface 30. After the optical fusion splice 164 is created between the rear end 34 of the optical fiber stub 16 and the front end 140 of the field optical fiber 142 in the ferrule bore 18, the fiber optic cable 144 may be secured to the crimp body 94, as illustrated in FIG. 6 (block 138 in FIG. 5), to form the fiber optic cable assembly 154. The fiber optic cable assembly 154, and specifically the optical transfer efficiency of the optical fusion splice 164 between the rear end 34 of the optical fiber stub 16 and the front end 140 of the field optical fiber 142, can be tested, if desired (block 139 in FIG. 5).

Figure 8A:
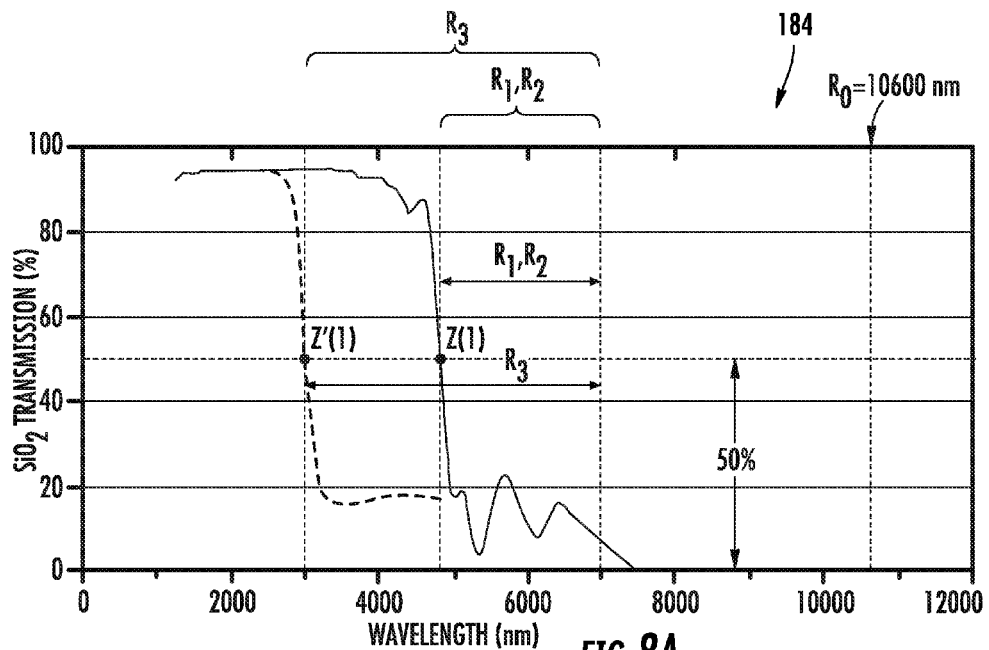
FIG. 8A is an exemplary chart illustrating an exemplary percent transmission of a carbon dioxide ($CO_2$) laser beam and carbon monoxide (CO) laser beam through a one-hundred (100) micrometer ($\mu m$) thick sample of silicon dioxide ($SiO_2$) versus wavelengths of the $CO_2$ laser beam and the CO laser beam, respectively.
Figure 8B:
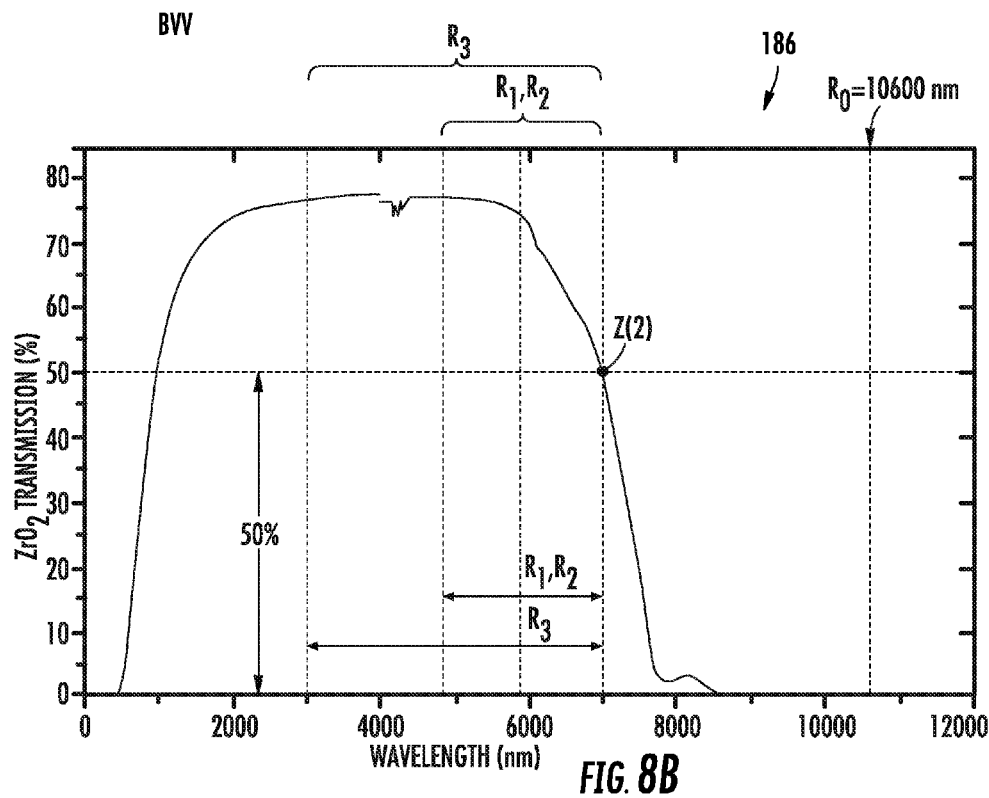
FIG. 8B is a second exemplary chart illustrating an exemplary percent transmission of a $CO_2$ laser beam and CO laser beam through a one-half (0.5) millimeter (mm) thick sample of zirconium dioxide ($ZrO_2$) versus wavelengths of the $CO_2$ laser beam and the CO laser beam, respectively.

With the laser processing apparatus 166 in FIG. 7 introduced and discussed, exemplary sensitivity of materials used for the optical fiber stub 16 and field optical fiber 142, and the ferrule 14 will be discussed in relation to providing enough laser energy in the laser beam 158 to fusion splice the rear end 34 of the optical fiber stub 16 to the front end 140 of the field optical fiber 142. As to the optical fiber stub 16 and field optical fiber 142, the laser beam 158 including the at least one wavelength in the range $R_1$ may be incident upon the optical fiber stub 16 and field optical fiber 142 and efficiently provide power for thermal forming. In this regard, FIG. 8A is an exemplary chart 184 illustrating an exemplary percent transmission of a carbon dioxide ($CO_2$) laser beam and carbon monoxide (CO) laser beam through a one-hundred (100) micrometer (μm) thick sample of silicon dioxide ($SiO_2$) versus wavelengths of the $CO_2$ laser beam and the CO laser beam, respectively. FIG. 8B is a second exemplary chart 186 illustrating an exemplary percent transmission of a $CO_2$ laser beam and CO laser beam through a one-half (0.5) mm thick sample of zirconium dioxide ($ZrO_2$) versus wavelengths of the $CO_2$ laser beam and the CO laser beam, respectively.

In FIG. 8A, the wavelength values in nanometers (nm) are provided on the X-axis labeled "WAVELENGTH (nm)." The percent transmission of laser energy at a given wavelength that is transmitted through the silicon dioxide ($SiO_2$) sample is provided on the Y-axis as "$SiO_2$ TRANSMISSION (%)." As can be seen in the first chart 184, a data point Z(1) can be defined where, at a wavelength of 4,700 nm, fifty percent (50%) of the laser beam 158 energy may be transmitted through the one-hundred micron thick sample. Wavelengths shorter than 4,700 nm exhibit a significantly higher transmission rate through the one-hundred micron thick sample as the energy passes through the one-hundred micron thick sample and is not available to heat and thereby thermally form the material.

It is noted that when the laser energy is orthogonally incident upon the one-hundred micron thick sample, the laser energy is reflected, absorbed, or transmitted. Only laser energy that is absorbed is available to enable the thermal forming to create the optical fusion splice 164 in the fiber optic cable assembly 154 in FIG. 6. The remaining laser energy not absorbed is either reflected or transmitted through the $SiO_2$ sample. In this regard, laser beam wavelengths greater than 4,700 nm are shown to transmit less than fifty percent (50%) of their energy through the one-hundred micron thick sample of $SiO_2$. Experience shows that laser beams having wavelengths greater than 4,700 nm may be adequate to deliver laser energy to an exemplary optical fiber stub 16 and field optical fiber 142 comprising a silicon dioxide material that may be one-hundred fifty microns thick in width or diameter.

For example, conventionally a carbon dioxide laser emitting a laser beam including a wavelength of 10,600 nm (See range $R_0$ in FIGS. 8A and 8B) may be used to thermally form the optical fusion splice 164 in the fiber optic cable assembly 154 in FIG. 6. If, for example, a carbon dioxide laser used as laser 168 in the laser processing apparatus 166 in FIG. 7 thermally shocks the ferrule 14, a carbon-monoxide laser may be used as the laser 168, emitting the laser beam 170 including the wavelength within the range $R_1$ to efficiently provide power to form the optical fusion splice 164 in the fiber optic cable assembly 154 in FIG. 7 for the optical fiber stub 16 and field optical fiber 142, which comprise silicon dioxide material.

Other materials may also be used for the optical fiber stub 16 and field optical fiber 142 and be compatible with the laser 168 in wavelength range $R_2$. Accordingly, absorptive or substantially absorptive as discussed herein means a characteristic of a material which transmits less than fifty (50) percent of incident laser beam energy for the wavelength range $R_2$ as measured for a one-hundred micron thick sample. An absorptive or substantially absorptive material may be used to configure the optical fiber stub 16 and field optical fiber 142. The laser 168 may be configured to emit a laser beam 170 including a wavelength in the range $R_2$, which may adequately thermally form the optical fusion splice 164 in the fiber optic cable assembly 154.

Moreover, optical fiber stub 16 and field optical fiber 142 may be modified by varying the content of hydroxide (HO) and other impurities in the optical fiber stub 16 and field optical fiber 142 to expand the range $R_2$ to give a range $R_3$. For example, changing the content of hydroxide and other impurities of the optical fiber stub 16 and field optical fiber 142 may modify the transmission of the optical fiber stub 16 and field optical fiber 142 to create a data point Z'(1), which transmits less than fifty (50) percent of incident laser beam energy at a 3,000 nm wavelength as shown in FIG. 8A. In this manner, the laser 168 may be configured to emit the laser beam 170 including a wavelength in the range $R_3$, which may also adequately thermally form the optical fusion splice 164 in the fiber optic cable assembly 154.

It is desired to avoid thermal shock of the ferrule 14. Thermal shock occurs when laser beam 158 is absorbed by the ferrule 14. As discussed earlier, the ferrule 14 may be made of a rigid material, for example, a ceramic material, which may be manufactured to tight tolerances. The ceramic material may be comprised of, for example, a $ZrO_2$ material. In this regard, FIG. 8B depicts a second exemplary chart 186 of a percent transmission of a laser beam through zirconium dioxide ($ZrO_2$) versus a wavelength of the laser beam for a half-millimeter thick sample of zirconium dioxide ($ZrO_2$). The wavelength values in nanometers (nm) are provided on the X-axis labeled "WAVELENGTH (nm)." The percent transmission of laser energy at a given wavelength that is transmitted through the zirconium dioxide ($ZrO_2$) sample is provided on the Y-axis as "$ZrO_2$ TRANSMISSION (%)." As can be seen in the second chart 186, a data point Z(2) can be shown where at a wavelength of 7,000 nm, fifty (50) percent of the laser beam 158 energy may be transmitted through the half-millimeter thick sample of zirconium dioxide ($ZrO_2$) and is unavailable for thermal shocking of the ferrule 14. Wavelengths longer than 7,000 nm exhibit much lower transmission through the half-millimeter thick sample as the energy is either reflected or absorbed within the half-millimeter thick sample. It has been observed that wavelengths shorter than 7,000 nm and greater than the 4,700 nm define a range $R_2$ depicted in FIG. 8B. The laser beams 158 including wavelengths in the range $R_2$ transmit at least fifty (50) percent of their energy through the half-millimeter thick sample and thereby have insufficient energy to thermal shock the ferrule 14. Thus, a laser 168 emitting the laser beam 158 including a wavelength range $R_2$ may thermally form the optical fusion splice 164 in the fiber optic cable assembly 154 without damaging the ferrule 14.

Other materials may also be used for the ferrule 14 and be compatible with forming the optical fusion splice 164 in the fiber optic cable assembly 154 utilizing the laser 168 emitting the laser beam 158 in this wavelength range $R_2$. Accordingly, transmissive or substantially transmissive, as discussed herein, means a characteristic of a material which transmits at least fifty (50) percent of incident laser beam energy for the wavelength range $R_2$ as measured for a half-millimeter thick sample. A transmissive or substantially transmissive material may be used to make the ferrule 14, wherein the laser 168 is configured to emit the laser beam 158 including a wavelength in the range $R_2$, without thermally shocking the ferrule 14.

Figure 9:
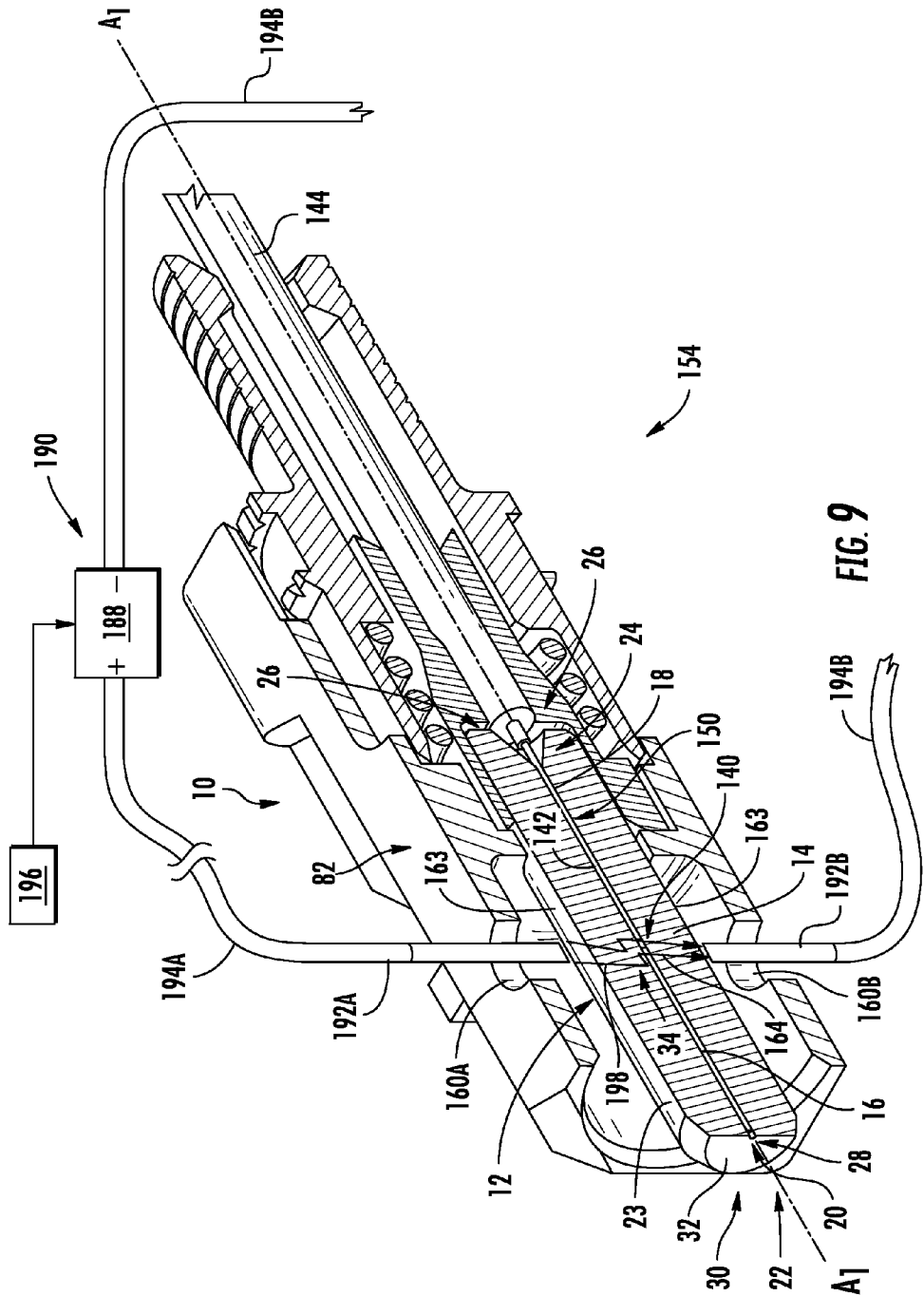
FIG. 9 is a right side, perspective, cross-sectional view of the pre-installed optical fiber stub of the pre-terminated fiber optic connector sub-assembly in FIG. 2, being electric arc fusion spliced to a front end of a field optical fiber of a fiber optic cable disposed in the ferrule bore adjacent to the rear end of the optical fiber stub in the ferrule bore.

Other methods of fusion splicing other than laser fusion splicing can be employed to fusion splice the optical fiber stub 16 to the field optical fiber 142 to terminate the pre-terminated fiber optic connector sub-assembly 10 onto the fiber optic cable 144. As another example, electric arc fusion may be employed to provide an alternative source of heat and thermal energy from a laser, to form a fusion splice between the rear end 34 of the optical fiber stub 16 and the front end 140 of the field optical fiber 142. In this regard, FIG. 9 is a right side, perspective, cross-sectional view of the pre-terminated fiber optic connector sub-assembly 10 in FIG. 1, with the optical fiber stub 16 being electric arc fused to the field optical fiber 142 to form optical fusion splice 164' and provide the fiber optic cable assembly 154. More specifically, the rear end 34 of the optical fiber stub 16 is electric arc fused to the front end 140 of the field optical fiber 142 of the fiber optic cable 144 in the ferrule bore 18 of the ferrule 14.

With continuing reference to FIG. 9, the pre-terminated fiber optic connector sub-assembly 10 is provided as previously described. The bare field optical fiber 142 is exposed from the fiber optic cable 144 and inserted into the ferrule bore 18 of the ferrule 14 through the rear opening 24 in the rear end 26 of the ferrule 14, as previously described to prepare for fusion splicing. A power supply 188 is provided as part of an electric arcing apparatus 190 to electric arc fuse the rear end 34 of the optical fiber stub 16 to the front end 140 of the field optical fiber 142 and form the optical fusion splice 164'. Two electrodes 192A, 192B are disposed in the ferrule access openings 160A, 160B adjacent an outer surface 163 of the ferrule 14 across from the intersection of the optical fusion splice 164' of the rear end 34 of the optical fiber stub 16 to the front end 140 of the field optical fiber 142 in the ferrule bore 18. The electrodes 192A, 192B are each connected via cables 194A, 194B respectively, to the power supply 188. The power supply 188 is controlled by a controller 196 to turn power off and on to provide electric current over the cables 194A, 194B to the electrodes 192A, 192B to provide an electric fusion arc 198 in contact with the outer surface 163 of the ferrule 14.

With continuing reference to FIG. 9, when an electric fusion arc 198 is in contact with the outer surface 163 of the ferrule 14, the initial electrical resistance of the ferrule 14 is high enough that the electric fusion arc 198 will travel around the diameter or perimeter of the ferrule 14. The ferrule bore 18 of the ferrule 14 where the rear end 34 of the optical fiber stub 16 is located in the ferrule bore 18 is not directly accessible from outside the ferrule 14. However, as the ferrule 14 is heated, the electric resistance of the composite of the ferrule 14 material (e.g., $ZrO_2$) begins to decrease until a critical point is reached where the electrical path of least resistance is for the electric fusion arc 198 to travel directly through the ferrule 14 through the ferrule bore 18. This phenomena enables fusion splicing within a ferrule bore 18 to fuse the rear end 34 of the optical fiber stub 16 to the front end 140 of the field optical fiber 142 to form optical fusion splice 164'.

Figure 10:
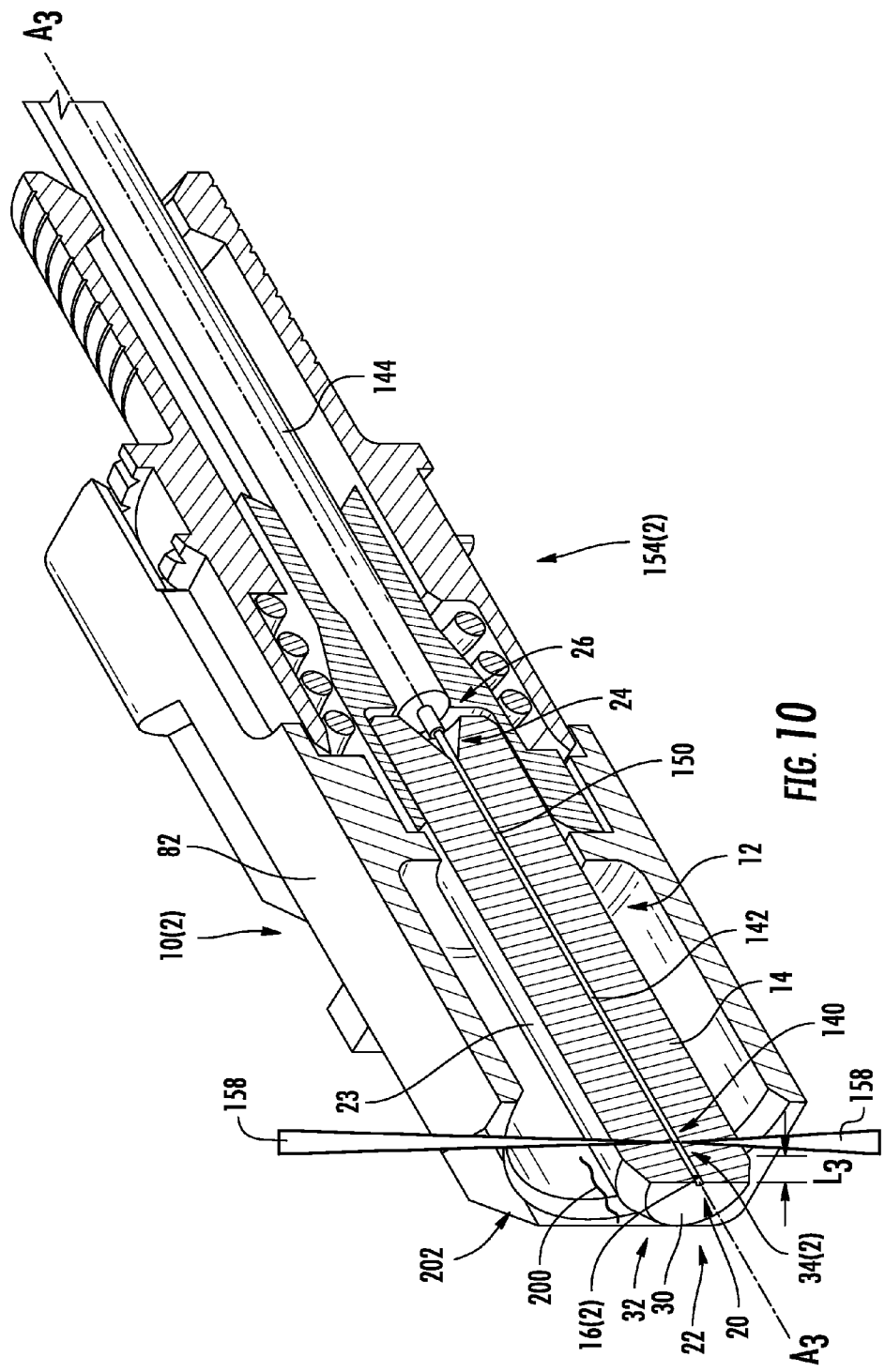
FIG. 10 is a right side, perspective, cross-sectional view of another exemplary pre-terminated fiber optic connector sub-assembly being laser fusion spliced to a front end of a field optical fiber of a fiber optic cable disposed in the ferrule bore adjacent to the rear end of the optical fiber stub in the ferrule bore, and similar to the pre-terminated fiber optic connector sub-assembly in FIG. 2, but without ferrule access openings being disposed in the connector sub-assembly housing.
Figure 11:
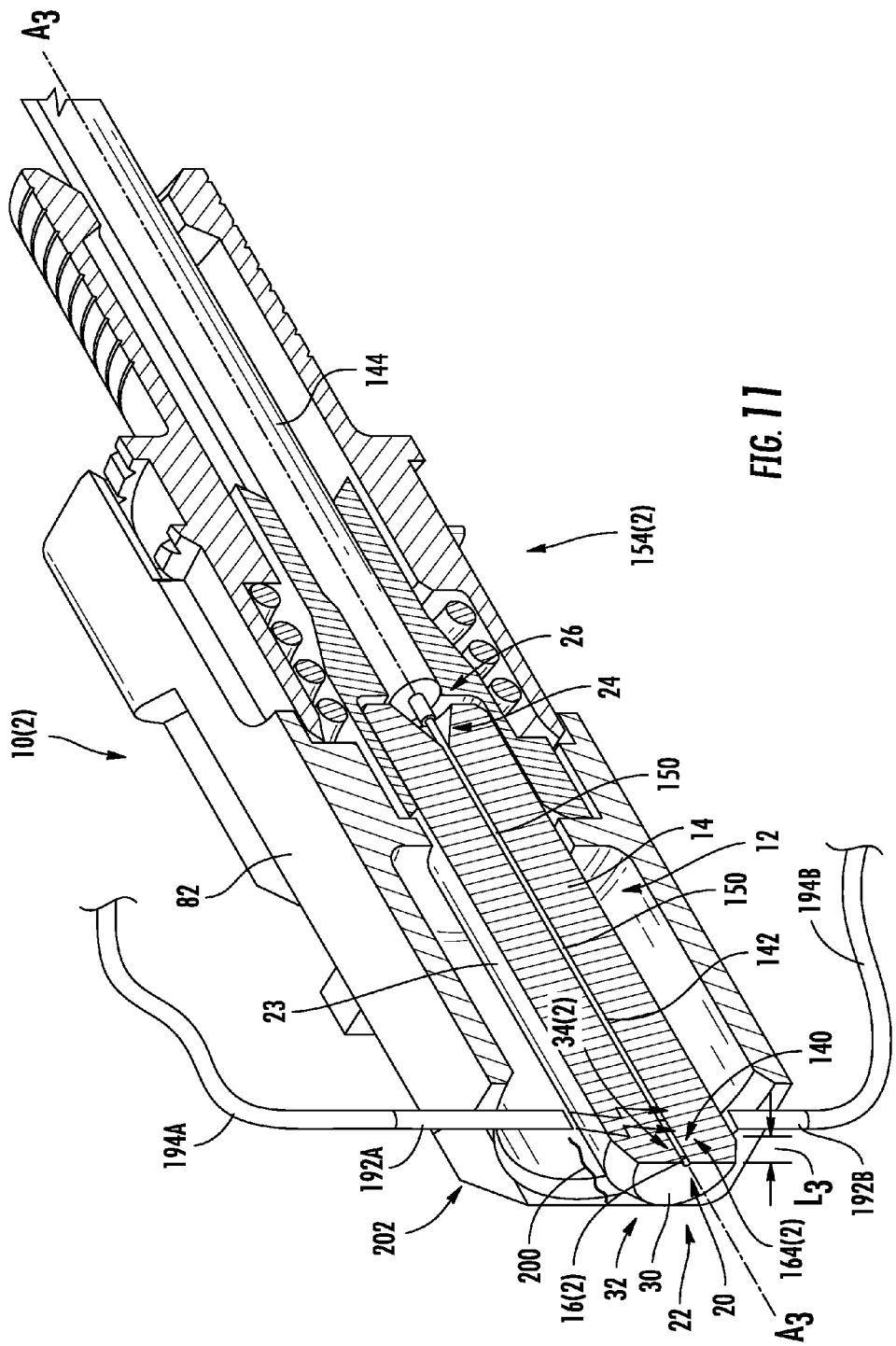
FIG. 11 is a right side, perspective, cross-sectional view of the pre-installed optical fiber stub of the pre-terminated fiber optic connector sub-assembly in FIG. 10, being electric arc fusion spliced to a front end of a field optical fiber of a fiber optic cable disposed in the ferrule bore adjacent to the rear end of the optical fiber stub in the ferrule bore.

The pre-terminated fiber optic connector sub-assembly 10 described above has the ferrule access openings 160A, 160B to provide access to the ferrule 14 for both laser fusion and electric arc fusion (e.g., see FIGS. 6 and 9, respectively). However, a pre-terminated fiber optic connector sub-assembly could be provided that does not include the ferrule access openings 160A, 160B, and still allow access to the ferrule 14 and ferrule bore 18 for fusing the rear end 34 of the optical fiber stub 16 to the front end 140 of the field optical fiber 142 to form an optical fusion splice. In this regard, FIGS. 10 and 11 are provided and described below. FIGS. 10 and 11 both illustrate right side, perspective, cross-sectional views of an alternative pre-terminated fiber optic connector sub-assembly 10(2) having longitudinal axis $A_3$ to provide a fiber optic cable assembly 154(2), which is similar to the pre-terminated fiber optic connector sub-assembly 10 in FIG. 1. Common components include common element numbers and will not be re-described. However, pre-terminated fiber optic connector sub-assembly 10(2) in FIGS. 10 and 11 does not include the ferrule access openings 160A, 160B in the connector sub-assembly housing 82. Instead, as discussed below in more detail, access to the ferrule 14 is provided by a portion 200 of the ferrule 14 that extends beyond a front end 202 of the connector sub-assembly housing 82. The optical fiber stub 16(2) is provided of a shorter length $L_3$ in the pre-terminated fiber optic connector sub-assembly 10(2) than the length $L_1$ of the optical fiber stub 16 in the pre-terminated fiber optic connector sub-assembly 10 (FIG. 1). For example, length L₃ of the optical fiber stub 16(2) may be at least 0.25 mm as a non-limiting example. In this manner, the rear end 34(2) of the optical fiber stub 16(2) is provided in a portion of the ferrule bore 18 that is located outside of the connector sub-assembly housing 82 and accessible at the front end 22 of the ferrule 14.

With reference to FIG. 10, the laser beam 158 from the laser processing apparatus 166 in FIG. 7 is directed to the front end 22 of the ferrule 14 and the portion 200 of the ferrule 14 that extends beyond the front end 202 of the connector sub-assembly housing 82. The thermal energy of the laser beam 158 can then be directed into the ferrule bore 18 of the ferrule 14 to fuse the rear end 34(2) of the optical fiber stub 16(2) to the front end 140 of the field optical fiber 142 to form an optical fusion splice 164(2). Similarly, in FIG. 11, the electrodes 192A, 192B can be placed on opposite sides of ferrule 14 in the portion 200 of the ferrule 14 that extends beyond the front end 202 of the connector sub-assembly housing 82 to provide an electric fusion arc 198 across the ferrule 14 and into the ferrule bore 18. The electric fusion arc 198 can fuse the rear end 34(2) of the optical fiber stub 16(2) to the front end 140 of the field optical fiber 142 to form an optical fusion splice 164(2), as previously described. The information described above for providing laser fusing and electric arc fusing of the optical fiber stub 16 to the field optical fiber 142 is equally applicable for the pre-terminated fiber optic connector sub-assembly 10(2) in FIGS. 10 and 11.

The pre-terminated fiber optic connector sub-assemblies 10, 10(2) described above can be provided on a fiber optic connector and terminated on a fiber optic cable to provide a fiber optic cable assembly, as previously described. In this regard, FIG. 12 is an exploded perspective view of an exemplary terminated fiber optic cable assembly 154(3) terminated with a fiber optic connector employing a pre-terminated fiber optic connector sub-assembly 10 or 10(2).

Figure 12:
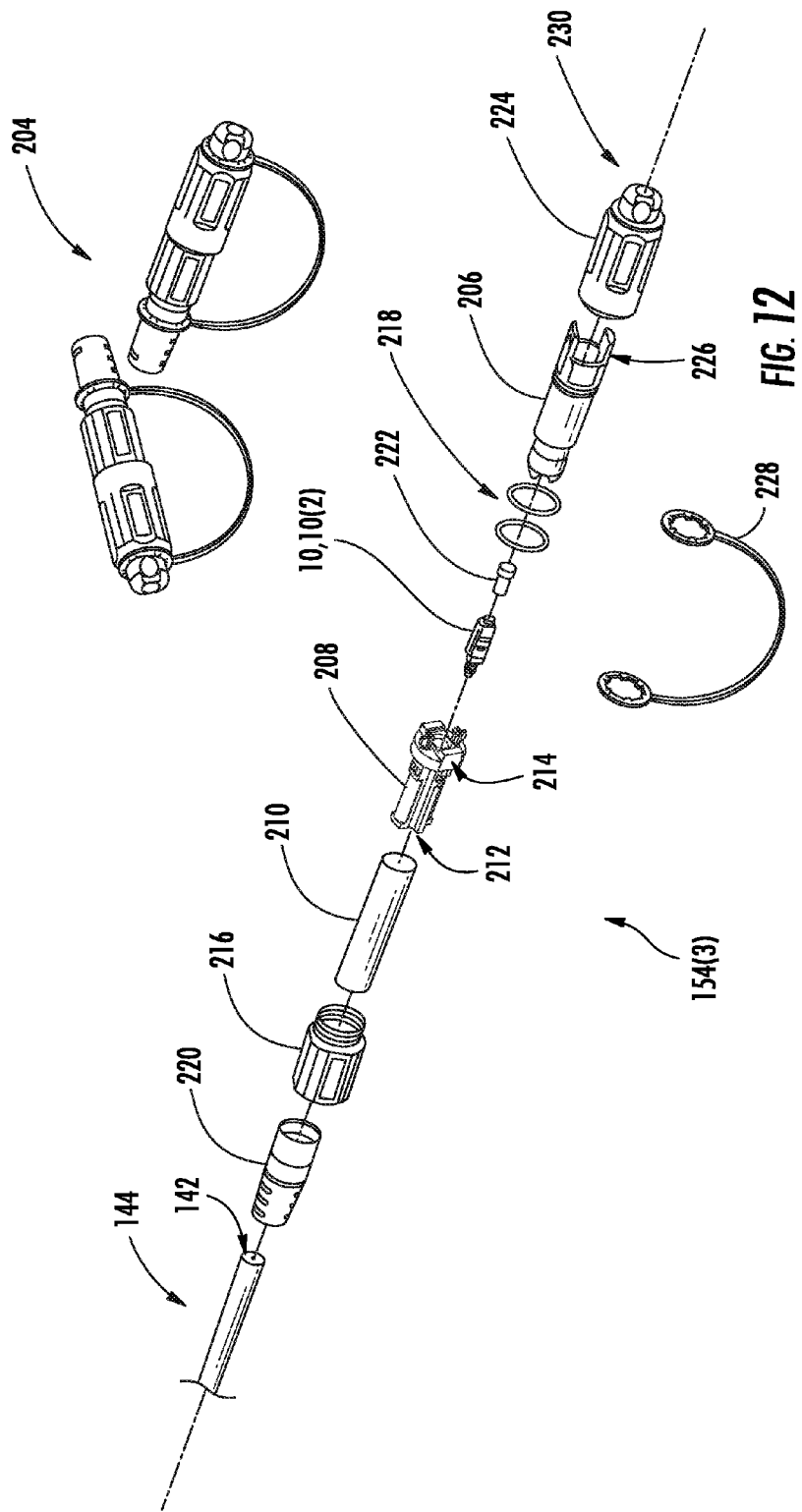
FIG. 12 is an exploded perspective view of an exemplary terminated fiber optic cable assembly terminated with a fiber optic connector employing a pre-terminated fiber optic connector sub-assembly.

Referring to FIG. 12, the fiber optic connector 204 provides a hardened plug connector (i.e., suitable for outside plant deployment, but it may be used indoors as well) adapted for connection with a complementary receptacle. The fiber optic connector 204 in this embodiment includes a plug housing 206 in which a retention body 208 and a pre-terminated fiber optic connector sub-assembly 10, 10(2) are generally disposed during assembly. A heat shrink 210 is also utilized. The retention body 208 facilitates optical coupling of at least one field optical fiber 142 of the fiber optic cable 144 to the pre-terminated fiber optic connector sub-assembly 10, 10(2) having the ferrule 14. As illustrated in this embodiment, the fiber optic cable 144 is a single-fiber drop cable and ferrule 14 is a single-fiber ferrule, although the use of other types of drop cables, optical fibers, connector types, and/or ferrules are possible.

With continuing reference to FIG. 12, a first portion 212 of retention body 208 engages and retains one or more strength members provided inside the fiber optic cable 144 for strain relief. A second portion 214 of retention body 208 engages and retains the pre-terminated fiber optic connector sub-assembly 10, 10(2). The fiber optic connector 204 also includes a coupling nut 216 that is externally threaded for engaging threads of a complementary connector, receptacle, bulkhead or the like (not shown), thereby aligning and optically mating ferrule 14 of fiber optic connector 204 and a complementary ferrule.

In this embodiment, the fiber optic connector 204 also includes one or more silicone O-rings 218 that environmentally seal fiber optic connector 204 and receptacle, when joined, and a boot 220 that further relieves stress in fiber optic cable 144. The fiber optic connector 204 can incorporate one or more dust caps 222, 224 that are used to selectively protect the ferrule 14 and an exposed end 226 of the plug housing 206. Preferably, the larger of the dust caps 224 (also referred to as the "pulling cap") is internally threaded such that it is configured to engage the external threading of coupling nut 216. Finally, pulling cap 224 may be secured to boot 220 via a lanyard 228 or other retention means, so that the pulling cap 224 is not easily lost. Pulling cap 224 also incorporates an integral pulling eye 230 designed for pulling the cable assembly into position.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structures in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of pre-terminating a fiber optic connector sub-assembly, comprising:
   providing at least one optical fiber stub of a fixed length, the at least one optical fiber stub having at least one front end and at least one rear end;
   inserting the at least one optical fiber stub through at least one ferrule bore of a ferrule body of a ferrule, wherein the at least one optical fiber stub disposed in the at least one ferrule bore is not directly accessible through the ferrule body;
   extending at least one front end of the at least one optical fiber stub through at least one front opening of the ferrule body from a front end of the ferrule body to dispose at least one rear end of the at least one optical fiber stub within the at least one ferrule bore at the front end of the ferrule body;
   inserting at least one front end of at least one optical fiber through at least one rear opening of the ferrule into the at least one ferrule bore of the ferrule, adjacent to the at least one rear end of the at least one optical fiber stub; and
   fusion splicing the at least one rear end of the at least one optical fiber stub with the at least one front end of the at least one optical fiber within the at least one ferrule bore to terminate the at least one optical fiber.

2. The method of claim 1, further comprising forming at least one optical surface in a front end face at the front end of the ferrule from the at least one front end of the at least one optical fiber stub, for establishing an optical connection with the at least one optical fiber stub.

3. The method of claim 2, wherein forming the at least one optical surface further comprises thermally ablating the at least one front end of the at least one optical fiber stub.

4. The method of claim 1, wherein inserting the at least one optical fiber stub through the at least one ferrule bore further comprises disposing the at least one rear end of the at least one optical fiber stub a preset distance to the front end of the ferrule.

5. The method of claim 1, wherein inserting the at least one optical fiber stub through the at least one ferrule bore further comprises disposing the at least one rear end of the at least one optical fiber stub at least 0.25 mm from the front end of the ferrule.

6. The method of claim 1, wherein inserting the at least one optical fiber stub through the at least one ferrule bore further comprises inserting the at least one optical fiber stub through the at least one front opening in the front end of the ferrule into the at least one ferrule bore.

7. The method of claim 1, further comprising disposing a bonding agent on the at least one optical fiber stub before inserting the at least one optical fiber stub into the at least one ferrule bore, to dispose the bonding agent in the at least one ferrule bore to secure the at least one optical fiber stub in the at least one ferrule bore.

8. The method of claim 1, further comprising disposing a bonding agent on the at least one optical fiber stub during the inserting of the at least one optical fiber stub into the at least one ferrule bore, to dispose the bonding agent in the at least one ferrule bore to secure the at least one optical fiber stub in the at least one ferrule bore.

9. The method of claim 1, further comprising disposing a bonding agent in the at least one ferrule bore before inserting the at least one optical fiber stub into the at least one ferrule bore, to secure the at least one optical fiber stub in the at least one ferrule bore.

10. The method of claim 1, further comprising the at least one ferrule bore passively aligning the at least one optical fiber stub to the at least one front end of the at least one optical fiber inserted through the at least one rear opening of the ferrule into the at least one ferrule bore.

11. The method of claim 1, wherein the fusion splicing comprises directing a laser beam of at least one wavelength to an outer surface of the ferrule to direct thermal energy of the laser beam to an outer surface of the ferrule towards the at least one rear end of the at least one optical fiber stub disposed adjacent to the at least one front end of the at least one optical fiber.

12. The method of claim 11, wherein the fusion splicing further comprises directing the laser beam through at least one ferrule access opening disposed in an outer body surface of a connector sub-assembly housing supporting the ferrule, to direct the thermal energy of the laser beam on an outer surface of the ferrule towards the at least one rear end of the at least one optical fiber stub disposed adjacent to the at least one front end of the at least one optical fiber.

13. The method of claim 11, wherein the fusion splicing further comprises directing the laser beam to an outer surface of a portion of the ferrule extending from a connector sub-assembly housing supporting the ferrule, to direct the thermal energy of the laser beam towards the at least one rear end of the at least one optical fiber stub disposed adjacent to the at least one front end of the at least one optical fiber.

14. The method of claim 13, wherein the ferrule is transmissive or substantially transmissive to the at least one wavelength of the laser beam, and the at least one optical fiber stub is absorptive or substantially absorptive to the at least one wavelength of the laser beam.

15. The method of claim 14, wherein directing the laser beam further comprises directing the laser beam from a carbon monoxide (CO) laser.

16. The method of claim 1, wherein the fusion splicing comprises directing an electric arc beam across the at least one rear end of the at least one optical fiber stub disposed adjacent to the at least one front end of the at least one optical fiber.

17. A method of pre-terminating a fiber optic connector sub-assembly, comprising:
providing a pre-terminated fiber optic connector sub-assembly that includes:
a ferrule comprising a ferrule body having a front end and a rear end and at least one ferrule bore extending between the front end and rear end of the ferrule body, wherein the ferrule comprises a ceramic material; and
at least one optical fiber stub disposed in the at least one ferrule bore, the at least one optical fiber stub having at least one rear end disposed within the at least one ferrule bore, and wherein the at least one rear end of the optical fiber stub is not directly accessible through the ferrule body;
inserting at least one front end of at least one optical fiber through at least one rear opening of the ferrule and into the at least one ferrule bore, to be adjacent to the at least one rear end of the at least one optical fiber stub; and
fusion splicing the at least one rear end of the at least one optical fiber stub with the at least one front end of the at least one optical fiber within the at least one ferrule bore to terminate the at least one optical fiber, wherein the fusion splicing comprises:
directing a laser beam of at least one wavelength to an outer surface of the ferrule, wherein the ferrule does not include a fiber access port in the outer surface to directly access the at least one optical fiber stub disposed in the at least one ferrule bore, and further wherein the ferrule comprises a ceramic material that is transmissive to at least 50% of the at least one wavelength of the laser beam and the at least one optical fiber stub transmits less than 50% the at least one wavelength of the laser beam, such that the thermal energy of the laser beam is transmitted through the ferrule to the at least one rear end of the at least one optical fiber stub that is disposed adjacent to the at least one front end of the at least one optical fiber.

18. The method of claim 17, further comprising:
forming at least one optical surface in a front end face at the front end of the ferrule from at least one front end of the at least one optical fiber stub, for establishing an optical connection with the at least one optical fiber stub.

19. The method of claim 17, wherein forming the at least one optical surface further comprises thermally ablating the at least one front end of the at least one optical fiber stub.

20. The method of claim 17, wherein the ferrule is comprised of a zirconium oxide material and the at least one optical fiber stub is comprised of a silica material, and further wherein the at least one wavelength is in a wavelength range from 5200 nanometers (nm) to 5800 nm.

* * * * *